United States Patent [19]

Hirayama et al.

[11] Patent Number: 5,771,333
[45] Date of Patent: Jun. 23, 1998

[54] VIDEO SIGNAL EMPHASIS AND DEEMPHASIS METHOD AND APPARATUS

[75] Inventors: Ryo Hirayama, Kamakura; Kaoru Kobayashi, Yokohama, both of Japan

[73] Assignee: Victor Company of Japan, Yokohama, Japan

[21] Appl. No.: 705,004

[22] Filed: Aug. 29, 1996

Related U.S. Application Data

[63] Continuation of Ser. No. 172,226, Dec. 23, 1993, abandoned.

[30] Foreign Application Priority Data

Dec. 24, 1992 [JP] Japan .................... 4-359260

[51] Int. Cl.⁶ ............................................. H04N 5/923
[52] U.S. Cl. .............................................. 386/85; 286/93
[58] Field of Search ................................ 386/46, 48, 13, 386/85–12, 9, 93; 348/613; H04N 5/76, 5/923

[56] References Cited

U.S. PATENT DOCUMENTS

| | | | |
|---|---|---|---|
| 4,618,893 | 10/1986 | Hirota et al. | 358/167 |
| 4,626,927 | 12/1986 | Hiroto et al. | 348/613 |
| 4,658,305 | 4/1987 | Tsushima | 358/327 |
| 5,126,846 | 6/1992 | Niimura | 358/340 |
| 5,179,476 | 1/1993 | Fujimoto et al. | 386/85 |
| 5,194,998 | 3/1993 | Kawasaki | 386/85 |
| 5,305,112 | 4/1994 | Yamamoto et al. | 358/310 |

FOREIGN PATENT DOCUMENTS

| | | |
|---|---|---|
| 0486300 | 5/1992 | European Pat. Off. . |
| 60-30296 | 2/1985 | Japan . |
| 1-64480 | 3/1989 | Japan . |

OTHER PUBLICATIONS

Patent Abstract of Japan, vol. 13, No. 277 (E–778), Jun. 26, 1989 & JP–A–01 064 480 (Nippon Hoso Kyokai), Mar. 10, 1989.

Patent Abstract of Japan, vol. 17, No. 125 (E–1332), Mar. 16, 1993 & JP–A–04 299 672 (Victor Co. of Japan Ltd.) Oct. 22, 1992.

Patent Abstract of Japan, vol. 11, No. 363 (E–560), Nov. 26, 1987 & JP–A–62 137 994 (Sony Corporation), Jun. 20, 1987.

Patent Abstract of Japan vol. 11, No. 363 (E–560), Nov. 26, 1987 & JP–A–62 137 995 (Sony Corporation), Jun. 20, 1987.

Patent Abstract of Japan vol. 14, No. 79 (E–888), Feb. 14, 1990 & JP–A–01 291 592 (Matusushita Elec. Ind. Co.) Nov. 24, 1989.

Development of Temporal Emphasis System, ITEC 1990, pp. 417 and 418.

Development of Emphasis in Video Signal Recording/Reproducing Apparatus, ITEC 1984, pp. 321–322.

Temporal Emphasis for Video Tape Recorder, ITEC 1992, pp. 341 and 342.

*Primary Examiner*—Thai Than
*Assistant Examiner*—Huy Nguyen
*Attorney, Agent, or Firm*—Jacobson, Price, Holman & Stern, PLLC

[57] ABSTRACT

An input video signal is applied to a transmission line first through a time direction emphasizer for emphasizing the levels of time direction high frequency components of the video signal, relative to the levels of low frequency components thereof; secondary through a vertical direction emphasizer; and thirdly through a horizontal direction emphasizer. Further, the received video signal is outputted as an output video signal from the transmission line first through a horizontal direction deemphasizer for deemphasizing the levels of horizontal direction high frequency components of the video signal, relative to the levels of low frequency components thereof; secondary through a vertical direction deemphasizer; and thirdly through a time direction deemphasizer. The emphasis and deemphasis method enables the dynamic range of the transmission line to be utilized effectively, while preventing erroneous operation on the reception side.

27 Claims, 17 Drawing Sheets

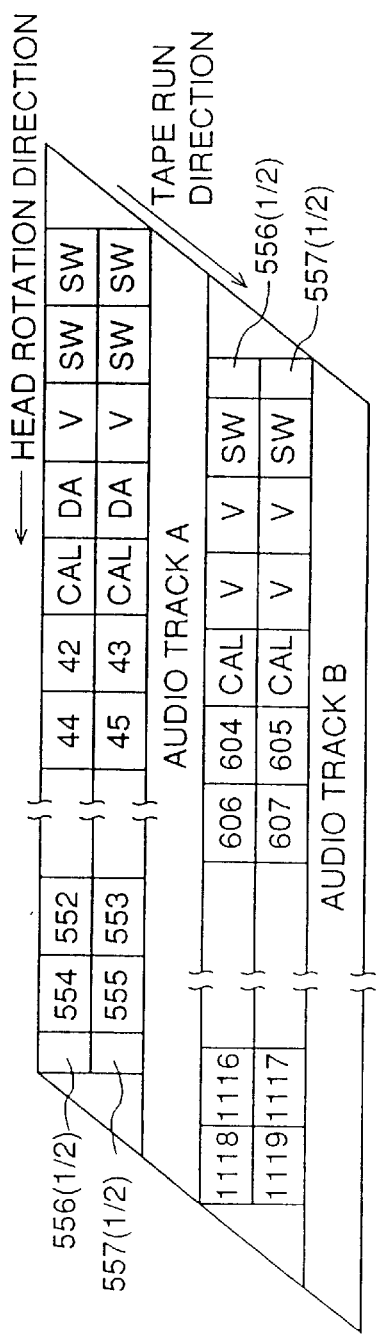
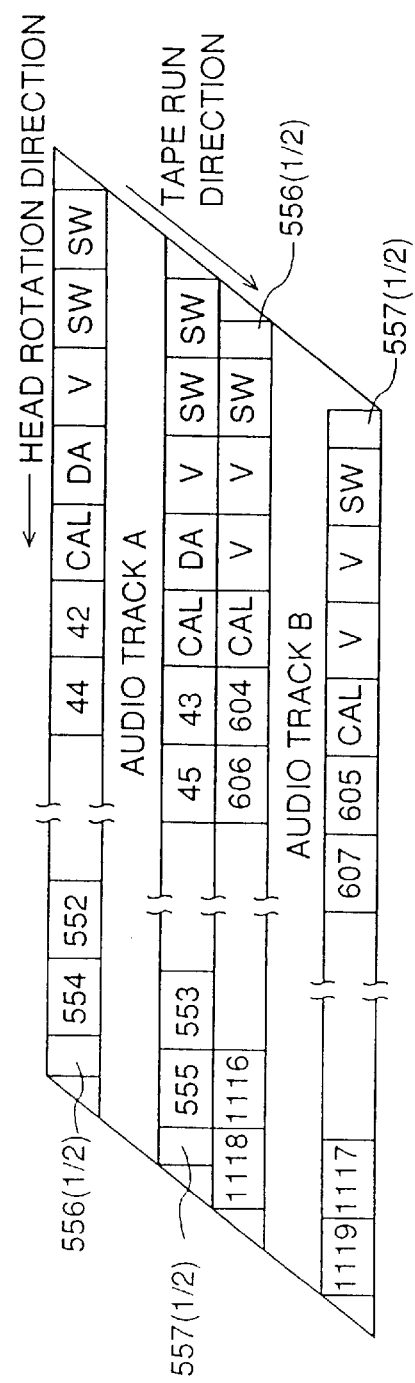
FIG.13A
FIG.13B

VIDEO SIGNAL EMPHASIS AND DEEMPHASIS METHOD AND APPARATUS

This is a Continuation of application Ser. No. 08/172,226, filed Dec. 23, 1993 which was abandoned upon the filing hereof.

BACKGROUND OF THE INVENTION

1. Field of the Invention

The present invention relates to a method of and apparatus for emphasizing and/or deemphasizing video signals, which are suitable for magnetic recording and reproducing apparatuses.

2. Description of the Prior Art

As the emphasis and deemphasis methods applicable to the magnetic video signal recording and reproducing apparatus (referred to as "VTR" (video tape recorder), hereinafter), the methods of emphasizing and deemphasizing video signals in the horizontal, vertical and time directions have been so far well known. These conventional emphasis and deemphasis methods will be described hereinbelow with reference to FIGS. 1A, 1B and 1C, respectively. In the horizontal direction emphasis and deemphasis method, as shown in FIG. 1A, the levels of high frequency components of a video signal at any given pixel P on a picture are emphasized or deemphasized (attenuated) on the basis of information on both sides of the pixel P in the horizontal direction. In the vertical direction emphasis and deemphasis method, as shown in FIG. 1B, the levels of high frequency components of a video signal at any given pixel P on a picture are emphasized or deemphasized on the basis of information on both sides of the pixel P in the vertical direction. Further, in the time direction emphasis and deemphasis method, as shown in FIG. 1C, the level of high frequency components a video signal at any given pixel P on a picture are emphasized or deemphasized on the basis of information on both sides of the pixel P in the time direction; that is, in the field (or frame) direction (before and after fields or frames). In the conventional emphasis and deemphasis methods, however, these methods have been so far only proposed separately and independently. In other words, the sequence of the emphases and deemphases in the horizontal, vertical and time directions has been so far not taken into account, and therefore not at all proposed.

However, the sequence of the emphases and deemphases in the horizontal, vertical and time directions is an important factor for deciding the performance of the apparatus on the receiving side (reproducing side) in particular.

SUMMARY OF THE INVENTION

Accordingly, it is the object of the present invention to provide a method of and an apparatus for emphasizing and/or deemphasizing video signals sequentially with respect to the horizontal, vertical and time directions.

To achieve the above-mentioned object, the first aspect of the present invention provides a video signal emphasis method comprising the steps of: emphasizing levels of high frequency components of an input video signal in a time direction, relative to those of low frequency components thereof; emphasizing levels of high frequency components of the time-direction emphasized video signal in a vertical direction, relative to those of low frequency components thereof; and emphasizing levels of high frequency components of the vertical-direction emphasized video signal in a horizontal direction, relative to those of low frequency components thereof. In the video signal emphasis method, the time direction emphasis and the vertical direction emphasis are both non-linear emphases each for emphasizing the levels of the high frequency components variably according to levels of the input signal.

Further, in the above-mentioned video signal emphasis method, when TCI (Time Compensated Integration) signals of a plurality of groups are recorded on a recording medium; the TCI signals being obtainable by dividing input video signals of a plurality of sorts into a plurality of groups, compressing the divided video signals of a plurality of sorts on a time axis line by line, respectively, and multiplexing the compressed video signals on the time axis; the method comprises the steps of: emphasizing the video signals of a plurality of sorts in the time direction; emphasizing the time-direction emphasized video signals in the vertical direction; dividing the video signals of a plurality of sorts into a plurality of groups; and emphasizing the TCI signals of a plurality of groups in the horizontal direction. In the video signal emphasis method, the time direction emphasis and the vertical direction emphasis are both non-linear emphases each for emphasizing the levels of the high frequency components variably according to levels of the input signals.

Further, in the above-mentioned video signal emphasis method, when TCI signals of a plurality of groups are recorded on a recording medium; the TCI signals being obtainable by dividing input video signals of a plurality of sorts into a plurality of groups, compressing the divided video signals of a plurality of sorts on a time axis line by line respectively, and multiplexing the compressed video signals on the time axis; the method comprises the steps of: emphasizing the TCI signals of a plurality of groups in the time direction; emphasizing the time-direction emphasized TCI signals in the vertical direction; and emphasizing the vertical-direction emphasized TCI signals in the horizontal direction. In the video signal emphasis method, the time direction emphasis and the vertical direction emphasis are both non-linear emphases each for emphasizing the levels of the high frequency components variably according to levels of the input signals.

Further, in the above-mentioned video signal emphasis method, when TCI signals of a plurality of groups are recorded on a recording medium; the TCI signals being obtainable by dividing input video signals of a plurality of sorts into a plurality of groups, compressing the divided video signals of a plurality of sorts on a time axis line by line respectively, and multiplexing the compressed video signals on the time axis; the method comprises the steps of: emphasizing the divided video signals of a plurality of sorts in the time direction; emphasizing the time-direction emphasized divided video signals in the vertical direction; forming the TCI signals of a plurality of groups; and emphasizing the vertical-direction emphasized TCI signals of a plurality of groups in the horizontal direction. In the video signal emphasis method, the time direction emphasis and the vertical direction emphasis are both non-linear emphases each for emphasizing the levels of the high frequency components variably according to levels of the input signals.

Further, the second aspect of the present invention provides a video signal deemphasis method comprising the steps of: deemphasizing levels of high frequency components of an input video signal in a horizontal direction, relative to those of low frequency components thereof; forming a control signal on the basis of a synchronizing signal related to the horizontal-direction deemphasized video signal; deemphasizing levels of high frequency components of the horizontal-direction deemphasized video signal in a vertical direction on the basis of the formed control signal, relative to those of low frequency components thereof; and deemphasizing levels of high frequency components of the vertical-direction deemphasized video signal in a time direction on the basis of the formed control signal, relative to those of low frequency components thereof. In the video signal deemphasis method, the time direction deemphasis and the vertical direction deemphasis are both non-linear deemphases each for deemphasizing the levels of the high frequency components variably according to levels of the input signal.

Further, in the above-mentioned video signal deemphasis method, when TCI signals of a plurality of groups are reproduced from a recording medium in which the TCI signals of a plurality of groups have been recorded, the reproduced TCI signals of a plurality of groups are time-axis expanded to reproduce divided input video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: deemphasizing the reproduced TCI signals of a plurality of groups in the horizontal direction; expanding the TCI signals of a plurality of groups on the time axis; deemphasizing the synthesized video signals of a plurality of sorts in the vertical direction on the basis of the control signal; and deemphasizing the vertical-direction deemphasized video signals of a plurality of groups in the time direction on the basis of the control signal. In the video signal deemphasis method, the time direction deemphasis and the vertical direction deemphasis are both non-linear deemphases each for deemphasizing the levels of the high frequency components variably according to levels of the input signals.

Further, in the above-mentioned video signal deemphasis method, when TCI signals of a plurality of groups are reproduced from a recording medium in which the TCI signals of a plurality of groups have been recorded, the reproduced TCI signals of a plurality of groups are time-axis expanded to reproduce divided input video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: deemphasizing the reproduced TCI signals of a plurality of groups in the horizontal direction; deemphasizing the horizontal-direction emphasized TCI signals of a plurality of groups in the vertical direction on the basis of the control signal; deemphasizing the horizontal-direction deemphasized TCI signals of a plurality of groups in the time direction on the basis of the control signal; and expanding the TCI signals of a plurality of groups on the time axis. In the video signal deemphasis method, the time direction deemphasis and the vertical direction deemphasis are both non-linear deemphases each for deemphasizing the levels of the high frequency components variably according to levels of the input signals.

Further, in the above-mentioned video signal deemphasis method, when TCI signals of a plurality of groups are reproduced from a recording medium in which the TCI signals of a plurality of groups have been recorded, the reproduced TCI signals of a plurality of groups are time-axis expanded to reproduce divided input video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: deemphasizing the reproduced TCI signals of a plurality of groups in the horizontal direction; expanding the TCI signals of a plurality of groups on the time axis to reproduce the divided video signals of a plurality of sorts; deemphasizing the divided video signals of a plurality of sorts in the vertical direction on the basis of the control signal; deemphasizing the vertical-direction deemphasized divided video signals of a plurality of sorts in the time direction on the basis of the control signal; and synthesizing the divided video signals of a plurality of sorts to reproduce the video signals of a plurality of sorts. In the video signal deemphasis method, the time direction deemphasis and the vertical direction deemphasis are both non-linear deemphases each for deemphasizing the levels of the high frequency components variably according to levels of the input signals.

Further, the third aspect of the present invention provides a video signal emphasis and deemphasis method comprising the steps of: emphasizing levels of high frequency components of a video signal in a time direction, relative to those of low frequency components thereof; emphasizing levels of high frequency components of the time-direction emphasized video signal in a vertical direction, relative to those of low frequency components thereof; emphasizing levels of high frequency components of the vertical-direction emphasized video signal in a horizontal direction, relative to those of low frequency components thereof; deemphasizing levels of high frequency components of the horizontal-direction emphasized video signal which is transmitted through a predetermined transmission line, in a horizontal direction, relative to those of low frequency components thereof; forming a control signal on the basis of a synchronizing signal related to the horizontal-direction deemphasized video signal; deemphasizing levels of high frequency components of the horizontal-direction deemphasized video signal in a vertical direction on the basis of the formed control signal, relative to those of low frequency components thereof; and deemphasizing levels of high frequency components of the vertical-direction deemphasized video signal in a time direction on the basis of the formed control signal, relative to those of low frequency components thereof.

Further, in the above-mentioned video signal emphasis and deemphasis method, when TCI signals of a plurality of groups are recorded on a recording medium, the TCI signals of a plurality of groups are reproduced from a recording medium in which the TCI signals of a plurality of groups have been recorded, the reproduced TCI signals of a plurality of groups are time-axis expanded to reproduce divided video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: emphasizing the video signals of a plurality of sorts in the time direction; emphasizing the time-direction emphasized video signals in the vertical direction; dividing the video signals of a plurality of sorts into a plurality of groups; emphasizing the TCI signals of a plurality of groups in the horizontal direction to record the emphasized TCI signals on the recording medium; deemphasizing the TCI signals of a plurality of groups which are reproduced from the recording medium, in the horizontal direction; expanding the TCI signals of a plurality of groups on the time axis; deemphasizing the synthesized video signals of a plurality of sorts in the vertical direction on the basis of the control signal; and deemphasizing the vertical-direction deemphasized video signals of a plurality of sorts in the time direction on the basis of the control signal.

Further, in the above-mentioned video signal emphasis and deemphasis method, when TCI signals of a plurality of groups are recorded on a recording medium, the TCI signals of a plurality of groups are reproduced from a recording medium in which the TCI signals of a plurality of groups have been recorded, the reproduced TCI signals of a plurality of groups are time-axis expanded to reproduce divided video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: emphasizing the TCI signals of a plurality of groups in the time direction; emphasizing the time-direction emphasized TCI signals in the vertical direction; emphasizing the vertical-direction emphasized TCI signals in the horizontal direction to record the emphasized TCI signals on the recording medium; deemphasizing the TCI signals of a plurality of groups which are reproduced from the recording medium, in the horizontal direction; deemphasizing the horizontal-direction deemphasized TCI signals of a plurality of groups in the vertical direction on the basis of the control signal; deemphasizing the vertical-direction deemphasized TCI signals of a plurality of groups in the time direction on the basis of the control signal; and expanding the TCI signals of a plurality of groups on the time axis.

Further, in the above-mentioned video signal emphasis and deemphasis method, when TCI signals of a plurality of groups are recorded on a recording medium, the TCI signals of a plurality of groups are reproduced from a recording medium in which the TCI signals of a plurality of groups have been recorded, the reproduced TCI signals of a plurality of groups are time-axis expanded to reproduce divided video signals of a plurality of sorts, and the reproduced video signals of a plurality of sorts are further synthesized to obtain video signals of a plurality of sorts; the TCI signals being obtainable by dividing video signals of a plurality of sorts into a plurality of groups, compressing the divided video signals of a plurality of sorts on a time axis line by line respectively, and multiplexing the compressed video signals on the time axis; the method comprises the steps of: emphasizing the divided video signals of a plurality of sorts in the time direction; emphasizing the time-direction emphasized divided video signals in the vertical direction; forming the TCI signals of a plurality of groups; emphasizing the vertical-direction emphasized TCI signals of a plurality of groups in the horizontal direction to record the emphasized TCI signals on the recording medium; deemphasizing the TCI signals of a plurality of groups which are reproduced from the recording medium, in the horizontal direction; expanding the TCI signals of a plurality of groups on the time axis to reproduce the divided video signals of a plurality of sorts; deemphasizing the divided video signals of a plurality of sorts in the vertical direction on the basis of the control signal; deemphasizing the vertical-direction deemphasized divided video signals of a plurality of sorts in the time direction on the basis of the control signal; and synthesizing the divided video signals of a plurality of sorts to reproduce the video signals of a plurality of sorts.

Further, the present invention provides a video signal emphasis apparatus, comprising: time direction emphasis means for emphasizing levels of high frequency components of an input video signal in a time direction, relative to those of low frequency components thereof; vertical direction emphasis means for emphasizing levels of high frequency components of the time-direction emphasized video signal in a vertical direction, relative to those of low frequency components thereof; and horizontal direction emphasis means for emphasizing levels of high frequency components of the vertical-direction emphasized video signal in a horizontal direction, relative to those of low frequency components thereof. In the video signal emphasis apparatus, said time direction emphasis means and said vertical direction emphasis means are both non-linear emphasis means each for emphasizing the levels of the high frequency components variably according to levels of the input video signal.

Further, the present invention provides a recording apparatus having: dividing means for dividing input video signals of a plurality of sorts into a plurality of groups according to the number of scanning lines; converting means for converting the divided video signals of a predetermined sort into line sequence signals, respectively; multiple signal forming means for forming a plurality of multiple signals by time-axis compressing and further time-axis multiplexing a plurality of the divided video signals other than the predetermined sort and the line sequence signals; recording signal forming means for forming a plurality of recording signals on the basis of a plurality of the multiple signals; and recording means for modulating and recording the recording signals on a recording medium, which further comprises: time direction emphasis means for emphasizing levels of high frequency components of each of the video signals in a time direction, relative to those of low frequency components thereof; vertical direction emphasis means for emphasizing levels of high frequency components of each of the time-direction emphasized video signals in a vertical direction, relative to those of low frequency components thereof; non-linear horizontal direction emphasis means for emphasizing levels of high frequency components of each of the vertical-direction emphasized video signals in a horizontal direction, relative to those of low frequency components thereof, variably according to levels of the input video signals; and horizontal direction emphasis means for emphasizing levels of high frequency components of each of a plurality of the recording signals in a horizontal direction, relative to those of low frequency components thereof, the emphasized recording signals being supplied to said recording means. The time direction emphasis means and said vertical direction emphasis means are both non-linear emphasis means each for emphasizing the levels of the high frequency components of each of the input video signals variably according to levels of each of the input video signals of a plurality of sorts.

Further, the present invention provides a recording apparatus having: dividing means for dividing input video signals of a plurality of sorts into a plurality of groups according to the number of scanning lines; converting means for converting the divided video signals of a predetermined sort into line sequence signals, respectively; multiple signal forming means for forming a plurality of multiple signals by time-axis compressing and further time-axis multiplexing a plurality of the divided video signals other than the predetermined sort and the line sequence signals; recording signal forming means for forming a plurality of recording signals on the basis of a plurality of the multiple signals; and recording means for modulating and recording the recording signals on a recording medium, which further comprises: time direction emphasis means for emphasizing levels of high frequency components of each of a plurality of the multiple signals in a time direction, relative to those of low frequency components thereof; vertical direction emphasis means for synthesizing the time-direction emphasized multiple signals according to the number of the scanning lines to form a synthesized signal, emphasizing levels of high frequency components of the synthesized signal in a vertical direction relative to those of low frequency components thereof, and further dividing the time-direction emphasized and synthesized signal again into a plurality of video signals according to the number of scanning lines; non-linear horizontal direction emphasis means for emphasizing levels of high frequency components of each of the vertical-direction emphasized and divided video signals in a horizontal direction, relative to those of low frequency components thereof, variably according to levels of the video signals of a plurality of sorts, the non-linear horizontal direction emphasized signals being supplied to said recording signal ; and horizontal direction emphasis means for emphasizing levels of high frequency components of each of a plurality of the recording signals in a horizontal direction, relative to those of low frequency components thereof, the emphasized recording signals being supplied to said recording means. The time direction emphasis means and said vertical direction emphasis means are both non-linear emphasis means each for emphasizing the levels of the high frequency components of each of the input video signals variably according to levels of each of the input video signals of a plurality of sorts.

Further, the present invention provides a recording apparatus having: dividing means for dividing input video signals of a plurality of sorts into a plurality of groups according to the number of scanning lines; converting means for converting the divided video signals of a predetermined sort into line sequence signals, respectively; multiple signal forming means for forming a plurality of multiple signals by time-axis compressing and further time-axis multiplexing a plurality of the divided video signals other than the predetermined sort and the line sequence signals; recording signal forming means for forming a plurality of recording signals on the basis of a plurality of the multiple signals; and recording means for modulating and recording the recording signals on a recording medium, which further comprises: time direction emphasis means for emphasizing levels of high frequency components of each of a plurality of the divided video signals other than the predetermined sort and the line sequence signals in a time direction, relative to those of low frequency components thereof; first vertical direction emphasis means for emphasizing levels of high frequency components of the time-direction emphasized line sequence signals in a vertical direction relative to those of low frequency components thereof; second vertical direction emphasis means for synthesizing a plurality of the divided time-direction emphasized video signals other than the predetermined sort into a synthesized signal according to the number of the scanning lines, emphasizing levels of high frequency components of the synthesized signal in the vertical direction relative to those of low frequency components thereof, and further dividing the synthesized time-direction emphasized video signal into a plurality of video signals according to the number of scanning lines; non-linear horizontal direction emphasis means for emphasizing levels of high frequency components of each of the video signals vertical-direction emphasized by said first and second vertical direction emphasis means in a horizontal direction, relative to those of low frequency components thereof, variably according to levels of the video signals of a plurality of sorts, the non-linear horizontal direction emphasized signals being supplied to said recording signal and horizontal direction emphasis means for emphasizing levels of high frequency components of each of a plurality of the recording signals in a horizontal direction, relative to those of low frequency components thereof, the emphasized recording signals being supplied to said recording means. The time direction emphasis means and said first and second vertical direction emphasis means are all non-linear emphasis means each for emphasizing the levels of the high frequency components of each of the input video signals variably according to levels of each of the input video signals of a plurality of sorts.

Further, the present invention provides a video signal deemphasis apparatus, comprising: horizontal direction deemphasis means for deemphasizing levels of high frequency components of an input video signal in a horizontal direction, relative to those of low frequency components thereof; signal forming means for forming a control signal on the basis of a synchronizing signal related to the horizontal-direction deemphasized signal; vertical direction deemphasis means for deemphasizing levels of high frequency components of the horizontal-direction deemphasized video signal in a vertical direction on the basis of the formed control signal, relative to those of low frequency components thereof; and time direction deemphasis means for deemphasizing levels of high frequency components of the vertical-direction deemphasized video signal in a time direction on the basis of the formed control signal, relative to those of low frequency components thereof. The time direction deemphasis means and said vertical direction deemphasis means are both non-linear deemphasis means each for deemphasizing the levels of the high frequency components variably according to levels of the input video signal.

Further, the present invention provides a reproducing apparatus having: reproducing means for reproducing recorded signals from a recording medium in which a plurality of the recording signals have been recorded; the recording signals being obtainable by dividing, input video signals of a plurality of sorts into a plurality of groups according to the number of scanning lines, by converting the divided video signals of a predetermined sort into line sequence signals respectively, and by time-axis compressing and further time-axis multiplexing a plurality of the divided video signals other than the predetermined sort and the line sequence signals; inverting means for expanding a plurality of divided and compressed video signals other than the predetermined sort and a plurality of the line sequence signals for each scanning line on the basis of the reproduced recording signals; signal forming means for forming a plurality of first reproduced signals by inverting a plurality of the expanded line sequence signals; and synthesizing means for forming a plurality of a second reproduced signals by synthesizing a plurality of the expanded video signals and a plurality of the first reproduced signals according to the number of the scanning lines, which further comprises: horizontal direction deemphasis means for deemphasizing levels of high frequency components of each of the reproduced recording signals in a horizontal direction, relative to those of low frequency components thereof; signal forming means for forming a control signal on the basis of a synchronizing signal related to the horizontal-direction deemphasized signal; non-linear horizontal direction deemphasis means for deemphasizing levels of high frequency components of each of a plurality of the second reproduced signals in a horizontal direction, relative to those of low frequency components thereof, variably according to levels of the input video signals of a plurality of sorts; vertical direction deemphasis means for deemphasizing levels of high frequency components of each of the non-linear horizontal-direction deemphasized signals in a vertical direction on the basis of the control signal, relative to those of low frequency components thereof; and time direction deemphasis means, for deemphasizing levels of high frequency components of each of the vertical-direction deemphasized signals in a time direction on the basis of the control signal, relative to those of low frequency components thereof. The time direction deemphasis means and said vertical direction deemphasis means are both non-linear deemphasis means each for deemphasizing the levels of the high frequency components of variably according to levels of each of the input video signals of a plurality of sorts.

Further, the present invention provides a reproducing apparatus having: reproducing means for reproducing recorded signals from a recording medium in which a plurality of the recording signals have been recorded; the recording signals being obtainable by dividing input video signals of a plurality of sorts into a plurality of groups according to the number of scanning lines, by converting the divided video signals of a predetermined sort into line sequence signals respectively, and by time-axis compressing and further time-axis multiplexing a plurality of the divided video signals other than the predetermined sort and the line sequence signals; inverting means for expanding a plurality of divided and compressed video signals other than the predetermined sort and a plurality of the line sequence signals for each scanning line on the basis of the reproduced recording signals; signal forming means for forming a plurality of first reproduced signals by inverting a plurality of the expanded line sequence signals; and synthesizing means for forming a plurality of a second reproduced signals by synthesizing a plurality of the expanded video signals and a plurality of the first reproduced signals according to the number of the scanning lines, which further comprises: horizontal direction deemphasis means for deemphasizing levels of high frequency components of each of a plurality of the reproduced recording signals in a horizontal direction, relative to those of low frequency components thereof; signal forming means for forming a control signal on the basis of a synchronizing signal related to the horizontal-direction deemphasized signal; non-linear horizontal direction deemphasis means for deemphasizing levels of high frequency components of each of the horizontal-direction deemphasized signals in a horizontal direction, relative to those of low frequency components thereof, variably according to levels of the input video signals of a plurality of sorts; vertical direction deemphasis means for synthesizing the non-linear horizontal-direction deemphasized signals according to the number of scanning lines, deemphasizing levels of high frequency components of the synthesized signal in a vertical direction relative to those of low frequency components thereof, and further dividing the vertical-direction deemphasized signal according to the number of the scanning lines all on the basis of the control signal; and time direction deemphasis means for deemphasizing levels of high frequency components of each of the vertical-direction deemphasized signals in a time direction on the basis of the control signal, relative to those of low frequency components thereof, the time-direction deemphasized signals being supplied to said inverting means, respectively. The time direction deemphasis means and said vertical direction deemphasis means are both non-linear deemphasis means each for deemphasizing the levels of the high frequency components of variably according to levels of each of the input video signals of a plurality of sorts.

Further, the present invention provides a reproducing apparatus having: reproducing means for reproducing recorded signals from a recording medium in which a plurality of the recording signals have been recorded; the recording signals being obtainable by dividing input video signals of a plurality of sorts into a plurality of groups according to the number of scanning lines, by converting the divided video signals of a predetermined sort into line sequence signals respectively, and by time-axis compressing and further time-axis multiplexing a plurality of the divided video signals other than the predetermined sort and the line sequence signals; inverting means for expanding a plurality of divided and compressed video signals other than the predetermined sort and a plurality of the line sequence signals for each scanning line on the basis of the reproduced recording signals; signal forming means for forming a plurality of first reproduced signals by inverting a plurality of the expanded line sequence signals; and synthesizing means for forming a plurality of a second reproduced signals by synthesizing a plurality of the expanded video signals and a plurality of the first reproduced signals according to the number of the scanning lines, which further comprises: horizontal direction deemphasis means for deemphasizing levels of high frequency components of each of a plurality of the reproduced recording signals in a horizontal direction, relative to those of low frequency components thereof; signal forming means for forming a control signal on the basis of a synchronizing signal related to the horizontal-direction deemphasized signal; non-linear horizontal direction deemphasis means for deemphasizing levels of high frequency components of each of a plurality of the signals supplied from said inverting means in a horizontal direction, relative to those of low frequency components thereof, variably according to levels of the input video signals of a plurality of sorts; first vertical direction deemphasis means for synthesizing a plurality of the non-linear horizontal-direction deemphasized expanded video signals according to the number of scanning lines, deemphasizing levels of high frequency components of the synthesized signal in a vertical direction relative to those of low frequency components thereof, and further dividing the vertical-direction deemphasized signal according to the number of the scanning lines all on the basis of the control signal; second vertical direction deemphasis means for deemphasizing levels of high frequency components of each of a plurality of the non-linear horizontal-direction deemphasized and expanded line sequence signals in the vertical direction on the basis of the control signal, relative to those of low frequency components thereof; and time direction deemphasis means for deemphasizing levels of high frequency components of each of the first and second vertical direction deemphasized signals in a time direction on the basis of the control signal, relative to those of low frequency components thereof, the time-direction deemphasized signals being supplied to said signal and said synthesizing means, respectively. The time direction deemphasis means and said vertical direction deemphasis means are both non-linear deemphasis means each for deemphasizing the levels of the high frequency components variably according to levels of each of the input video signals of a plurality of sorts.

BRIEF DESCRIPTION OF THE DRAWINGS

FIGS. 13A and 13B are illustrations showing tape patterns;

DETAILED DESCRIPTION OF THE PREFERRED EMBODIMENTS

Figure 1A:
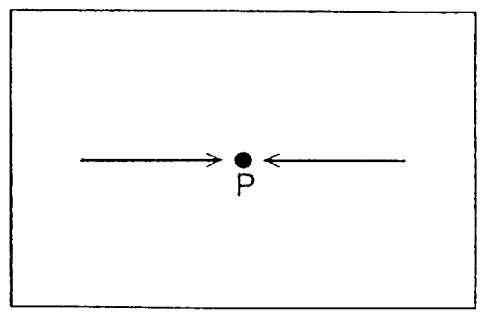
FIGS. 1A to 1C are conceptual diagrams for assistance in explaining the conventional emphasis and deemphasis in the horizontal, vertical and time axis directions, respectively.
Figure 1B:
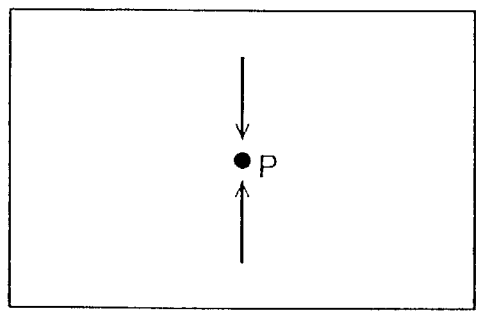
Figure 1C:
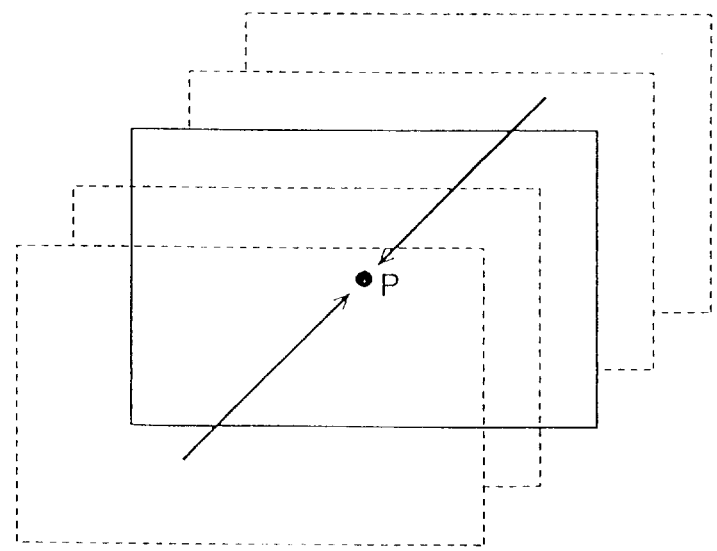

Embodiments of the present invention will be described in detail hereinbelow with reference to the attached drawings.

(1st Embodiment)

In this first embodiment, the emphases are implemented in the order of the time direction, the vertical direction and the horizontal direction; and the deemphases are implemented in the order of the horizontal direction, the vertical direction and the time direction on the basis of the following reasons:

In general, the object of the emphasis and deemphasis is to improve the S/N ratio of the output signal, by attenuating the high frequency components of an input signal so that the high frequency component noise generated through a transmission line can be eliminated. For this purpose, the high frequency components of the input signal are previously emphasized on the transmission side (on the recording side), and the emphasized signal (the recording signal) is transmitted (recorded). Further, the received signal (the reproducing signal) including high frequency component noise superposed upon the transmission signal is received (reproduced) via a transmission line (recording medium) on the reception side (reproduction side) and further the high frequency components of the received signal are attenuated to obtain an output signal of a high S/N ratio. Accordingly, the received signal itself is a signal of a low S/N ratio.

When the emphasis and deemphasis are implemented for a video signal, this implies that the received video signal is a signal of a low S/N ratio. On the other hand, since the video signal processing is controlled on the basis of various timings extracted from the horizontal and vertical synchronizing signals, it is important in the case of the video signal transmission system to separate the horizontal and vertical synchronizing signals on the reception side without erroneous operation.

In addition, since the horizontal direction deemphasis is related to continuous signals, the timings based upon the horizontal and vertical synchronizing signals are not required for the horizontal direction emphasis. In the case of the vertical direction deemphasis and the time direction deemphasis, however, since the information signals at sampling points separated by one line (1H) or one field (or frame) are required, the timing based upon the horizontal and vertical synchronizing signals are required.

Therefore, in this first embodiment, the horizontal direction deemphasis is first implemented on the reception side to generate the signal from which the high frequency components generated through the transmission line are eliminated to some extent, and then the vertical direction deemphasis and time direction deemphasis are both implemented on the basis of the synchronizing signal separated from the above-mentioned signal.

Further, since there exists a predetermined limitation in each of the dynamic ranges of the transmission line and the various emphasizer, it is important to prevent the high frequency signal components emphasized by the various emphasizer from exceeding the respective dynamic ranges of the emphasizer and the transmission line provided in the succeeding stage.

Here, in both the cases of the time direction emphasis and the vertical direction emphasis, although the high frequency components having a low correlation in the predetermined direction are emphasized, in general it is well known that the correlation of the video signal in the time axis direction is higher than that in the vertical direction. Therefore, it is advantageous to implement the time direction emphasis and thereafter to implement the vertical direction emphasis, under consideration of the dynamic ranges.

Accordingly, in this first embodiment, after the time direction emphasis has been implemented, the vertical direction emphasis is implemented and thereafter the horizontal direction emphasis is implemented.

On the other hand, in the deemphasis, the horizontal direction deemphasis must be first implemented and then the vertical direction deemphasis must be implemented. Here, since the emphasis and the deemphasis are of complementary relationship with respect to each other, the emphasis sequence is opposite to the deemphasis sequence or vice versa.

Therefore, in this first embodiment, the emphasis is implemented in the order of the time direction, the vertical direction and the horizontal direction. On the other hand, the deemphasis is implemented in the order of the horizontal direction, the vertical direction and the time direction. These emphasis and deemphasis will be described in more practical way with reference to FIG. 2.

Figure 2:
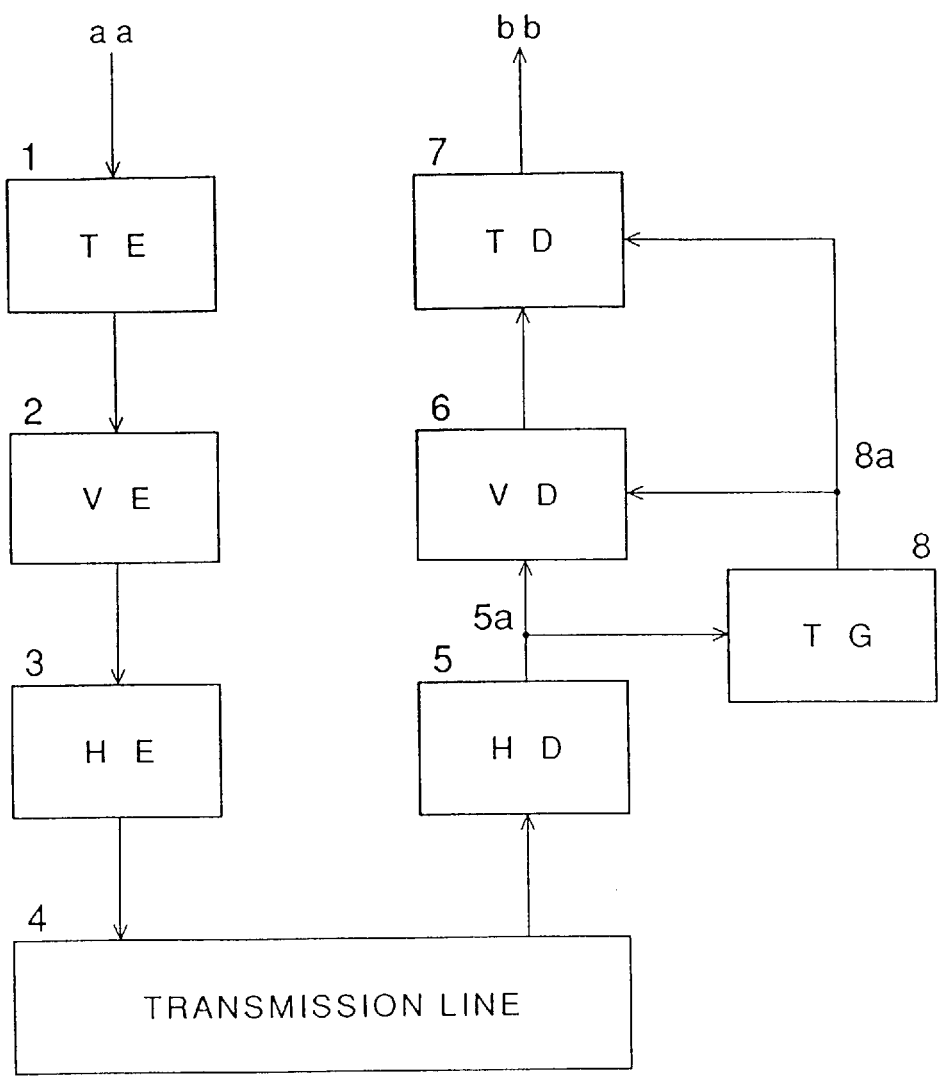
FIG. 2 is a block diagram showing a first embodiment of the method of emphasizing and deemphasizing video signals according to the present invention.
Figure 3:
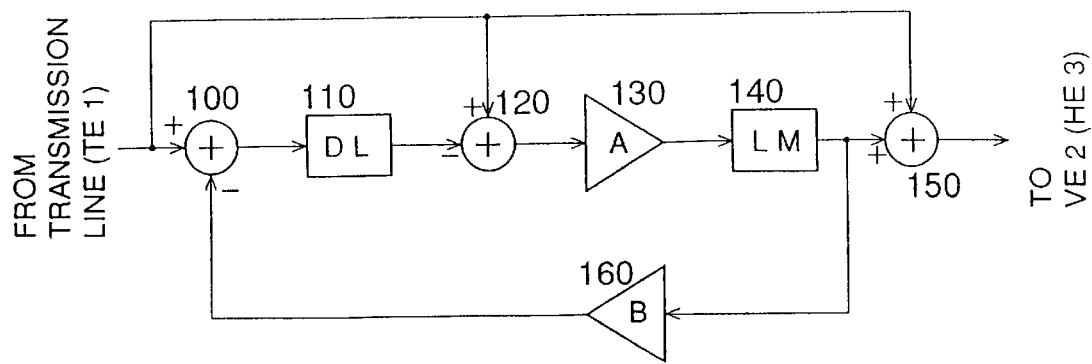
FIG. 3 is a block diagram showing vertical direction emphasizer and time direction emphasizer.

In FIG. 2, an input video signal aa is inputted to a time direction emphasizer (TE) 1 via a transmission line (not shown), by which the levels of high frequency components of the input video signal are emphasized in the time direction, as compared with those of low frequency components thereof. This time direction emphasizer 1 can be formed by a digital circuit. FIG. 3 is a block diagram showing a non-linear time direction emphasis circuit. In FIG. 3, the digital circuit is composed of a delay circuit 110 as a one-field (or one-frame) memory, adder-subtracters 100, 120 and 150, coefficient multipliers 130 and 160, and a limiter circuit 140 for providing non-linear characteristics. Further, this digital circuit can be adopted as the vertical direction emphasizer by using the delay circuit 110 as a one-horizontal (1H) memory.

In FIG. 3, the reason why the non-linear emphasis for emphasizing the high frequency components variably according to the level of the input signal is used as the time direction emphasizer is that the dynamic range at the rear succeeding stage is taken into account. Further, in the case where the linear emphasis (for emphasizing the high frequency components at a constant proportion irrespective of the input signal level) is used, it is possible to prevent the high frequency components from exceeding the dynamic range in the succeeding stage, by using the linear emphasizer of low emphasis proportion for the high frequency components. Further, in FIG. 3, it is of course possible to realize the linear emphasizer by removing the limiter circuit 140.

In FIG. 2 again, the output signal of the time direction emphasizer 1 is applied to a vertical direction emphasizer (VE) 2. This vertical direction emphasizer 2 can be formed by a digital circuit, through which the levels of the high frequency components are emphasized in the vertical direction, as compared with those of the low frequency components. The signal of the vertical direction emphasizer 2 is applied to a horizontal direction emphasizer (HE) 3. Further, in the vertical direction emphasizer 2, non-linear emphasis or linear emphasis in which an emphasis proportion for the high frequency components is low is adopted in the same way as with the case of the time direction emphasizer 1.

Figure 4A:
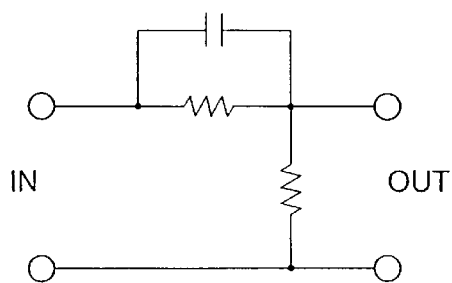
FIGS. 4A and 4B are circuit diagrams showing horizontal direction emphasizer and horizontal direction deemphasizer according to the present invention, respectively.
Figure 5A:
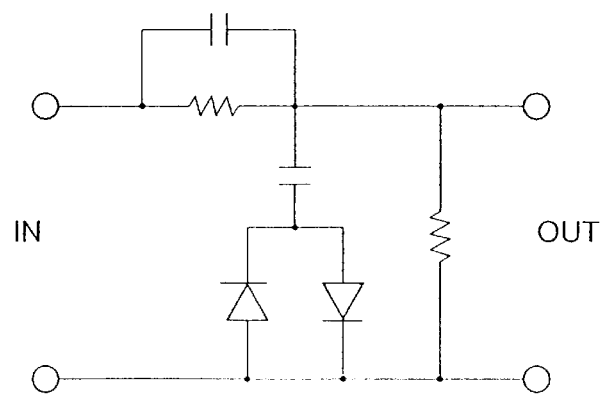
FIG. 5A and 5B are circuit diagrams showing non-linear horizontal direction emphasizer and non-linear horizontal direction deemphasizer according to the present invention.

Further, the horizontal direction emphasizer 3 emphasizes the levels of the high frequency components in the horizontal direction, as compared with those of the low frequency components. The horizontal direction emphasizer 3 can be formed by a linear emphasis circuit as shown in FIG. 4A or a non-linear emphasis circuit as shown in FIG. 5A.

The output signal of the horizontal direction emphasizer 3 is applied to a transmission line 4 via a modulator (not shown). The transmission line 4 is a radio wave, an optical cable, a telephone line, etc., or an optical recording and reproducing system such as an optical disk, a magnetic recording and reproducing system such as VTR, etc.

Figure 4B:
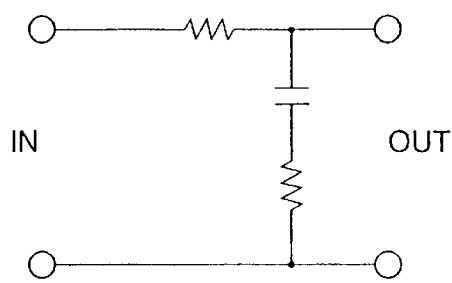
Figure 5B:
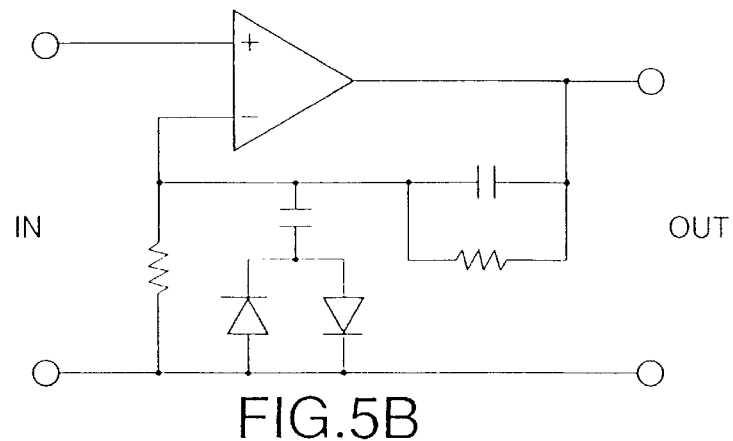

With reference to FIG. 2 again, the received video signal (reproducing video signal) is applied to a horizontal direction deemphasizer (HD) 5 via a demodulator (not shown). The horizontal direction deemphasizer 5 attenuates the levels of the high frequency components in the horizontal direction, as compared with those of the low frequency components, so as to obtain an output signal 5a in which noise generated through the transmission line 4 and included in the received video signal has been suppressed. Further, the horizontal direction deemphasizer 5 can be formed by a linear deemphasis circuit as shown in FIG. 4B or a non-linear deemphasis circuit as shown in FIG. 5B, respectively.

Further, the output signal 5a of the horizontal direction deemphasizer is applied to a timing generator (TG) 8 and a vertical direction deemphasizer (VD) 6. The timing generator 8 separates the synchronizing signal from the output signal 5a, and supplies control signals 8a (such as a clock signal, a timing signal, etc. formed on the basis of the separated synchronizing signal) to the vertical direction deemphasizer (VD) 6 and a time direction deemphasizer (TD) 7, respectively. Further, the clock signal can be generated by using well-known PLL (phase-locked loop) circuit on the basis of a synchronizing signal and/or a burst signal separated from the output signal 5a.

Figure 6:
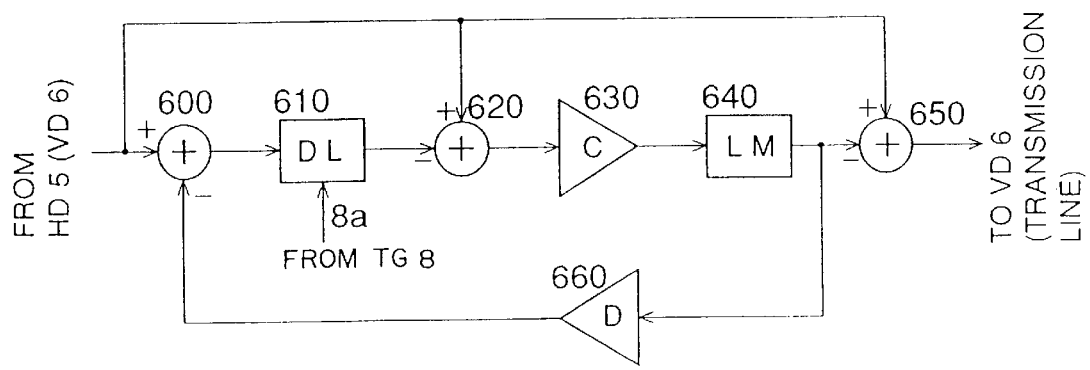
FIG. 6 is a block diagram showing vertical direction deemphasizer and time direction deemphasizer.

Further, the vertical direction deemphasizer (VD) 6 attenuates the levels of the high frequency components in the vertical direction, as compared with those of the low frequency components. The vertical direction deemphasizer (VD) 6 is a digital circuit. FIG. 6 is a block diagram showing a non-linear vertical direction deemphasis circuit. In FIG. 6, the digital circuit is composed of a delay circuit 610 as a one-line memory, adder-subtracters 600, 620 and 650, coefficient multipliers 630 and 660, and a limiter circuit 640 for providing non-linear characteristics. Further, this digital circuit can be adopted as the time direction deemphasizer by using the delay circuit 610 as the one-field (one-frame) memory. Further, when the linear vertical direction emphasis circuit is used on the transmission side, the linear vertical direction deemphasis circuit is of course used on the reception side. Further, when the limiter 640 is omitted, it is of course possible to realize the linear deemphasis circuit.

The output signal of the vertical direction deemphasizer (VD) 6 is applied to the time direction deemphasizer (TD) 7, and supplies the output video signal bb to the transmission line (not shown). In the video signal bb, the levels of the high frequency components are attenuated in the time direction, as compared with those of the low frequency components. Further, although the non-linear time direction deemphasis as shown in FIG. 6 can be used as the non-linear time direction emphasizer 2 shown in FIG. 2, when the linear time direction emphasis circuit is used on the transmission side, the linear time direction deemphasis circuit is of course used.

As described above, since the emphasis is implemented in the order of the time direction, the vertical direction and the horizontal direction, there exists such an effect that it is possible to utilize the dynamic range of the transmission line 4 effectively. In addition, since the deemphasis is implemented in the order of the horizontal direction, the vertical direction and the time direction, it is possible to implement the deemphasis in the vertical direction and the time direction in accordance with the control signals formed on the basis of the signal obtained by the horizontal direction deemphasizer (HD) 5, so that there exists such an effect that the deemphasis can be implemented securely without erroneous operation. Further, in the case where the transmission line 4 is of FM transmission line, since the triangular noise is usually generated in the FM transmission line, the above-mentioned method is particularly effective. In this case, the dynamic range of the transmission line implies the frequency band of the signal.

(2nd Embodiment)

The second to fourth embodiments of the present invention will be described hereinbelow, in which the first embodiment is applied to VTRs for magnetically recording and reproducing high vision signal (as an example of the high definition video signals such as MUSE signal, EDTV signal, ATV signal, etc.). In these embodiments, there are used all the time direction emphasizer 1, the vertical direction emphasizer 2, the horizontal direction emphasizer 3, the horizontal direction deemphasizer 5, the vertical direction deemphasizer 6 and the time direction deemphasizer 7. Further, in these embodiments, the input signals are luminance signal (referred to as Y signal, hereinafter), the first color difference signal (referred to as PB signal, hereinafter) and the second color difference signal (referred to as PR signal, hereinafter), which are all in conformity with the Japanese High Vision Signal Standard. These input signals are all obtained by converting the chrominance signals R, G and B signals in accordance with the following formulae:

$Y=0.7154G+0.0721B+0.2125R$ $PB=0.5389 (-0.7154G+0.9279B-0.2125R)$ $PR=0.6349 (-0.7154G-0.0721B+0.7875R)$

Further, these signals are divided into two groups for segment recording in order to reduce the transmission frequency band of the tape-head system; the PB signal and the PR signal are converted into line sequence chrominance signals; the converted signals are compressed on the time axis; and further these compressed signals are multiplexed with the Y signal also compressed on the time axis to obtain TCI signal. Here, in the second embodiment, the emphasis operation is implemented in the order of the time direction, the vertical direction and the non-linear horizontal direction, before these signals are divided into the two groups. In the third embodiment, the emphasis operation is implemented in the order of the time direction, the vertical direction and the non-linear horizontal direction, after these signals have been divided into the TCI signals. In the fourth embodiment, the emphasis operation is implemented in the order of the time direction, the vertical direction and the non-linear horizontal direction, after these signals have been divided into the two groups but before converted into the TCI signals.

Further, in the two to fourth embodiments, the HD (high definition) signal outputted by the video signal recording and reproducing apparatus is provided with information signal in a predetermined line, and the HD signal including the information signal is inputted to the video signal recording and reproducing apparatus. Therefore, the description will be made hereinbelow in the order of the information signal, the recording system and the reproducing system.

(Information Signals)

Figure 7A:
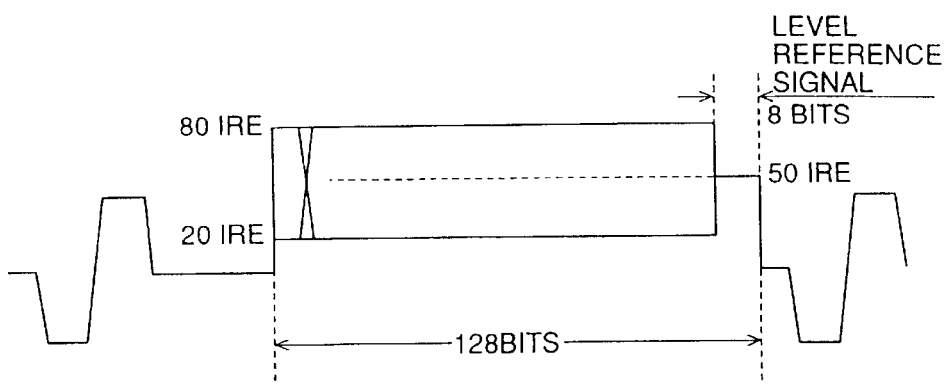
FIGS. 7A and 7B are a waveform diagram and a bit allocation of information signals, respectively.
Figure 7B:
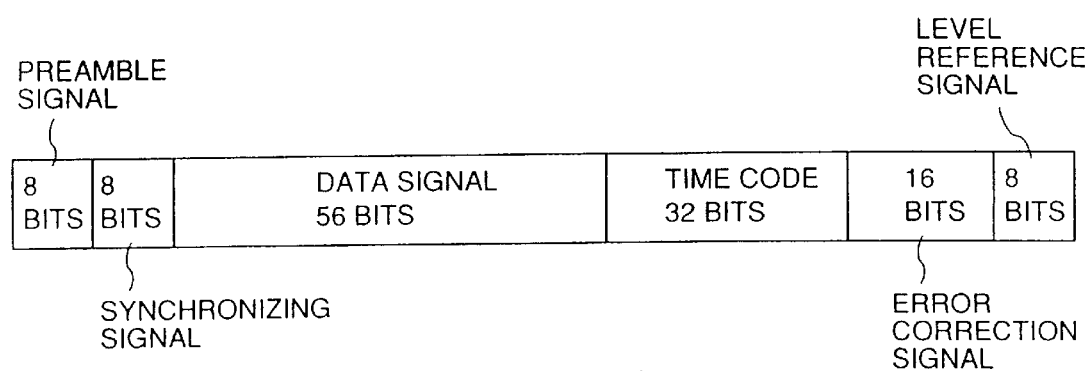

FIG. 7A shows the information signal interposed in a predetermined line of the Y signal related to the HD signal. As shown in FIG. 7B, the contents of the information signal are a preamble signal (8 bits) for taking synchronism with the clock signal in reproduction; a synchronizing signal (8 bits) for discriminating the data start, a data signal (56 bits) representative of the sort of the video signals, a time code signal (32 bits) representative of time information, an error correction signal (16 bits) for detecting and correcting an error signal in the reproduction, and a level reference signal (8 bits) for controlling the recording level. The normal level of the level reference signal is 50 IRE. With respect to the respective bits of the other signals, 20 IRE corresponds to a "0" level and 80 IRE corresponds to a "1" level, respectively.

The above-mentioned data is composed of 7 words in the unit of 8 bits. The first word is related to the format of the video signal, which represents, for instance the aspect ratio information (e.g., discrimination of 16:9 and 4:3), the video picture display format information (e.g., discrimination of a letter box or an ordinary format), the track system information (e.g., discrimination of HD, NTSC, EDTV, ATV, etc.). and the telecine information (e.g., discrimination of the same frame or not). Further, the second word includes the program ID information representative of the program number. Further, the third word represents the audio information (e.g., discrimination of stereophonic, monochrome, bilingual, etc.), the edition information (e.g., discrimination of edit start, edit end, during edit, etc.), the correction signal information (e.g., discrimination of the presence or absence of a correction signal), and the control signal information (e.g., discrimination of the duty ratios of the control signals such as VISS, VASS, etc.). Further, the fourth and fifth words are text information which represents the character information in accordance with the closed caption method. Further, the sixth and seventh words are spare words prepared for the future extension.

Further, the time code signal is composed of 4 words in the unit of 8 bits. The first word represents the frame numbers incremented for each frame; the second word represents the "second"; the third word represents the "minute"; and the fourth word represents "hour", respectively.

Figure 8A:
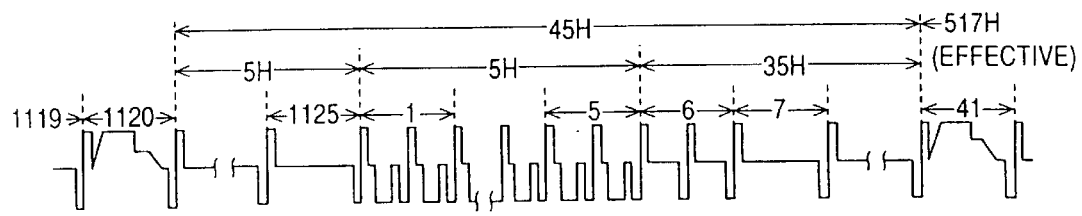
FIG. 8 is a waveform diagram showing a high vision signal.
Figure 8B:
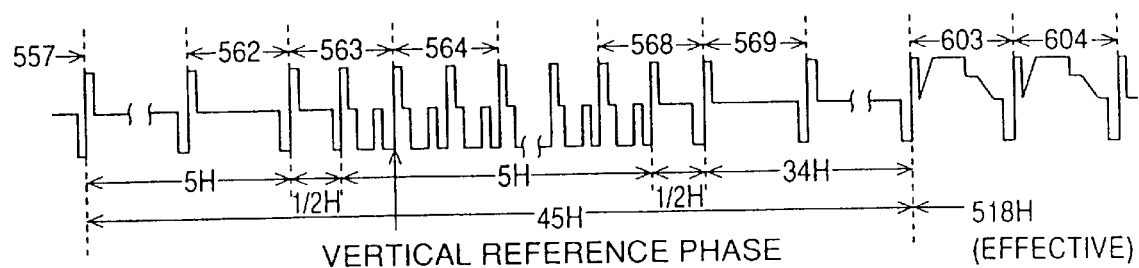

The line in which the information signal is interposed will be explained with reference to FIG. 8, in which the HD signal waveform is shown. In FIG. 8, the numerals shown in the drawing designate the line numbers, and the first line starts from the vertical synchronizing signal of an odd field.

Here, in the line in which the information signal is interposed, since there exists the case where the vertical blanking period and the horizontal synchronizing signal period are eliminated in some high-vision apparatus, it is necessary to interpose the information signal in the effective scanning line. Further, since the information signal is not the picture signal, it is necessary to consider that the monitor is provided with the over-scanning characteristics of about 8 to 10% with respect to all the scanning lines, so as not to display the information signal in a picture of the monitor.

Accordingly, under due consideration of these factors, the line in which the information signal is interposed becomes a single or plural lines between 41 and 66 lines, between 532 and 557 lines, between 603 and 628 lines, and between 1095 and 1120 lines of the HD signal.

On the other hand, the numbers of the scanning lines over-scanned by practical monitors differ from each other according to the apparatuses. Therefore, it is preferable to interpose the information signal in the effective scanning lines having a small possibility in that the information signal is visible in the picture. Further, in the case of the studio standard of the HD signal, the number of the effective scanning lines are 1035, and the picture period is between 41 and 557 lines and between 603 and 1120 lines. On the other hand, in the case of the MUSE decoder output signal, the number of the effective scanning lines are 1032 and the picture period is between 42 and 557 lines and between 604 and 1119 lines, respectively.

Therefore, the effective scanning lines are 41, 557, 603, 1120 lines, and 42, 604, 557 and 1119 lines, respectively, which can satisfy the above-mentioned conditions that the possibility is small in that the information signal is visible in the picture. In other words, it is preferable to interpose the information signal in one or plural lines of the 41, 42, 557, 603, 604, 1119 and 1120 lines.

Further, the 41 and 603 lines are the effective scanning lines of the HD signal in the studio standard, but not the effective scanning lines of the output signal of the MUSE decoder. Accordingly, it is desirable to interpose the information signals in the 41 and/or 603 lines, when the HD signal is not encoded into the MUSE signal.

Accordingly, in the magnetic video signal recording and reproducing apparatus according to the present invention, the information signal is interposed in the 603 line of the HD signal to be outputted, and the information signal is interposed in the 603 or 604 line of the HD signal to be inputted, under consideration of also the MUSE decoder output signal.

(Recording System)

Figure 9:
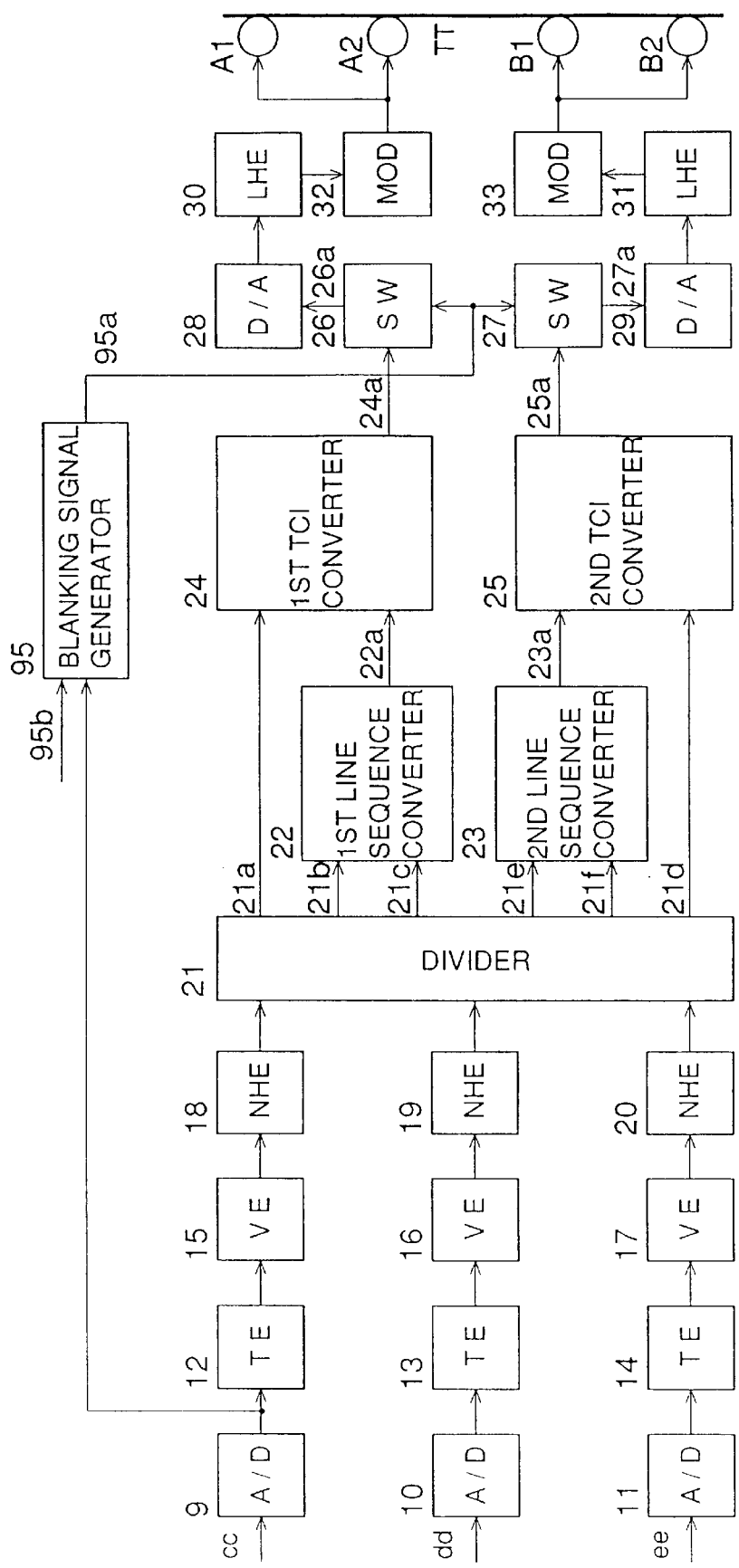
FIG. 9 is a block diagram showing a second embodiment of the present invention, which is applied to a magnetic recording apparatus.

FIG. 9 shows the recording system of the video signal recording and reproducing apparatus for recording and reproducing the HD signal. In FIG. 9, a Y signal cc, a PB signal dd, and a PR signal ee are all inputted from a transmission line (not shown) to time direction emphasizers 12 to 14, respectively through A/D converters 9 to 11, for implementing the linear or non-linear emphasis in the time direction, respectively. Further, the signals emphasized in the time direction are further applied to vertical direction emphasizers 15 to 17, respectively for implementing the linear or non-linear emphasis in the vertical direction, respectively. Further, the signals emphasized in the vertical direction are further applied to horizontal direction emphasizers (NHE) 18 to 20, respectively for implementing the non-linear emphasis in the horizontal direction, respectively.

Figure 10:
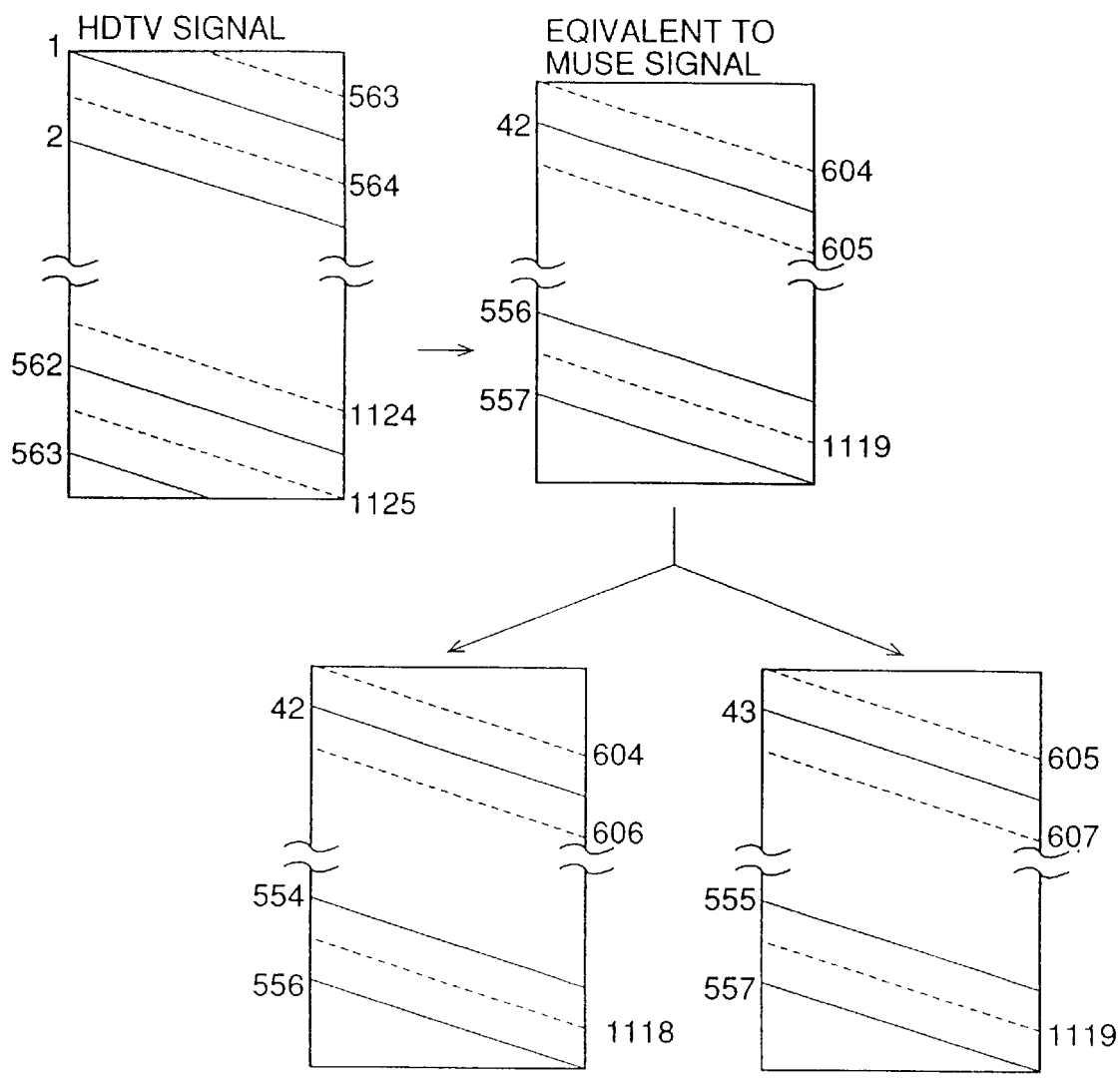
FIG. 10 is a conceptual view for assistance in explaining the operation of divider.

Further, the output signals of the non-linear horizontal direction emphasizers 18 to 20 are all applied to a divider 21 to divide these signals into two groups. This divisional processing will be described in further detail hereinbelow with reference to FIG. 10. The vertical synchronizing signals of the input Y signal cc, the PB signal dd and the PR signal ee (the HD signal) and the lines related to the upper and lower sides of the picture as shown on the upper left side in FIG. 10 are eliminated to form signals corresponding to the number (1032 lines) of effective scanning lines of the MUSE signal. Further, the formed signals are divided into two group signals as shown on the lower left and lower right sides in FIG. 10 to form the first Y, PB and PR signals 21a to 21c related to the even number lines and the second Y, PB and PR signals 21d to 21f related to the odd number lines, respectively.

Further, the first PB and PR signals 21b and 21c and the second PB and PR signals 21e and 21f are applied to first and second line sequence converters 22 and 23, respectively. The first and second line sequence chrominance signals 22a and 23a obtained by the line sequence processing are further applied to one input of each of first and second TCI converters (Time Compensated Integration Encoders) 24 and 25, respectively.

Figure 11A:
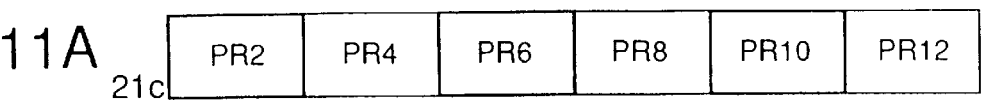
FIGS. 11A to 11F are conceptual views for assistance in explaining the operation of line sequence conversion processing means.
Figure 11B:
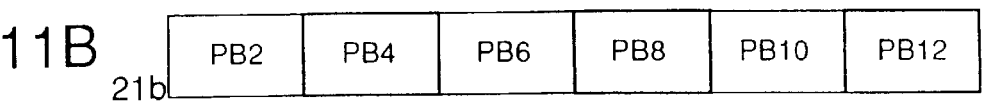
Figure 11C:
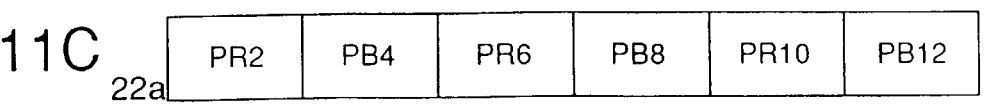
Figure 11D:
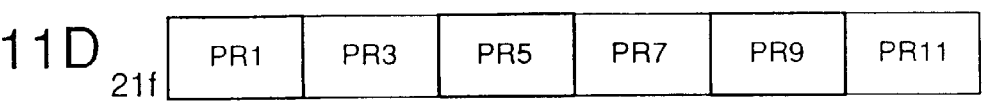
Figure 11E:
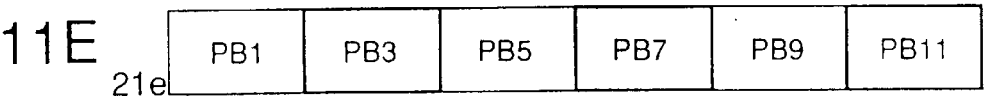
Figure 11F:
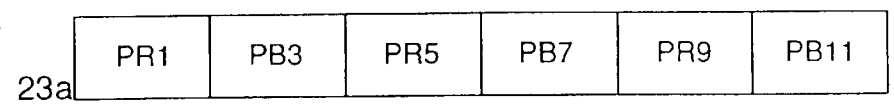

There are two modes in the line sequence processing, which will be described hereinbelow with reference to FIG. 11. In FIG. 11, the characters represent the sorts of signals and the numerals represent the line numbers of the HD signals. In the first mode, the first line sequence converter 22 selects the lines enclosed by thick lines of the first PR and PB signals 21c and 21b as shown in FIGS. 11A and 11B, respectively and alternately, in order to form the first line sequence chrominance signal 22a as shown in FIG. 11C. Further, in the first mode, the second line sequence converter 23 selects the lines enclosed by thick lines of the second PR and PB signals 21f and 21e as shown in FIGS. 11D and 11E, respectively and alternately, in order to form the second line sequence chrominance signal 23a as shown in FIG. 11F. On the other hand, in the second mode, the first line sequence converter 22 always selects only the first PB signal 21b in order to form the first line sequence chrominance signal 22a, and the second line sequence converter 23 always selects only the second PR signal 21f, in order to form the second line sequence chrominance signal 23a.

The first TCI converter 24 compresses the first line sequence chrominance signals 22a applied to one input of thereof and further the first Y signal 21a applied to the other input thereof both on the time axis; multiplexes both the signals on the time axis for each 1H to form the first TCI (Time Compensated Integration) signal 24a; and further supplies the formed first TCI signal 24a to the first selector (SW) 26. In the same way, the second TCI converter 25 compresses the second line sequence chrominance signals 23a applied to one input of thereof and further the second Y signal 21d applied to the other input thereof both on the time axis; multiplexes both the signals on time axis for each 1H to form the second TCI signal 25a; and further supplies the formed second TCI signal 25a to the second selector 27. Further, the time ratio of the compressed first and second Y signals 21a and 21d to the compressed first and second line sequence chrominance signals 22a and 23a is determined to be 3:1 in the first and second TCI signals 24a and 25a, under due consideration of the frequency bands of both the signals.

Figure 12B:
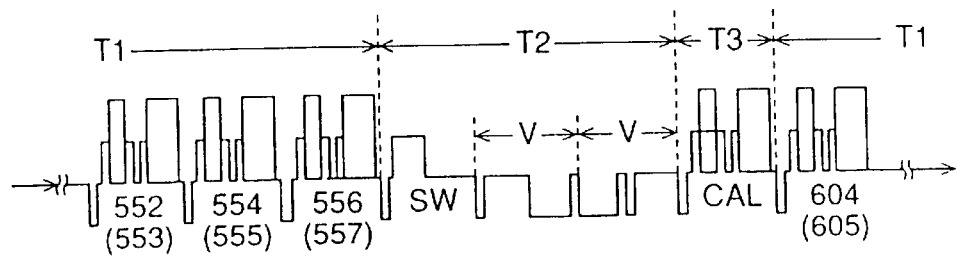
FIG. 12 is a waveform diagram showing a TCI signal.
Figure 12A:
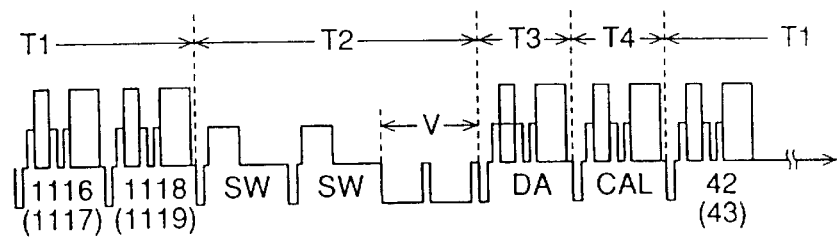

Further, the first and second selectors 26 and 27 select the first and second TCI signals 24a and 25a related to the picture and the blanking signals 95a (described later) to form first and second recording signals 26a and 27a, respectively as shown in FIG. 12. In more detail, in FIG. 12, the first and second TCI signals 24a and 25a are selected during the period T1, and the blanking signal 95a is selected during the other periods T2 to T4. Further, in FIG. 12, the signals represented by "SW" are switching signals for securing surplus (margin) portions during which the magnetic head is switched; the signals represented by "V" are vertical synchronizing signals; the signals represented by "DA" are TCI information signals; and the signals represented by "CAL" are correcting signals, respectively.

Here, a blanking signal generator 95 for generating the blanking signal 95a will be described hereinbelow. The A/D converted input Y signal cc is applied to one input of the blanking signal generator 95 to extract the information signal interposed in the 603 or 604 line. The extracted information signal is compared with a predetermined threshold level (e.g., the maximum level of the horizontal synchronizing signal) for error correcting and detecting processing. Further, an operation control signal 95b specified by the recording operation is applied to the other input of the blanking signal generator 95 in order to modify a part of the information signal appropriately. For instance, when editing is made, the editing information in the data signals is modified and in addition the time code information is changed. The modified information signal is compressed with respect to time to form the TCI information signal. The formed TCI information signal is synthesized with the other blanking signal such as a correcting signal stored in a ROM in a predetermined sequence in order to form a normal blanking signal 95a.

The first and second recording signals 26a and 27a thus obtained are applied to linear horizontal direction emphasizers (LHE) 30 and 31 via D/A converters 28 and 29, respectively. These linear horizontal direction emphasizer 30 and 31 emphasize the levels of the high frequency components in the horizontal direction, as compared with those of the low frequency components, and the emphasized signals are applied to FM modulators (MOD) 32 and 33, respectively. Further, the FM modulators 32 and 33 modulate the emphasized signals within a predetermined deviation. The modulated signals are amplified by recording amplifiers (not shown), and then recorded on a magnetic tape TT through magnetic heads A1 and A2 or B1 and B2, respectively.

The tape pattern of the magnetic tape TT will be described hereinbelow with reference to FIGS. 13A and 13B, in which the numerals represent the line number; "SW" designates the switching signal; "V" designates the vertical synchronizing signal; "CAL" designates the correcting signal; and "DA" designates the TCI information signal, respectively.

Here, the first recording signals 26a related to the even lines are recorded on the tracks related to between "SW" and "556 (½)" (shown in FIG. 13A) by the magnetic head A1 disposed on a rotary drum, and further recorded on the tracks related to between "556 (½)" and "1118" (shown in FIG. 13A) by the magnetic head A2. Further, the second recording signals 27a related to the odd lines are recorded on the tracks related to between "SW" and "557 (½)" (shown in FIG. 13A) by the magnetic head B1 disposed on the rotary drum, and further recorded on the tracks related to between "557 (½)" and "1119" (shown in FIG. 13A) by the magnetic head B2. Further, although the magnetic heads A1 and B1 or the magnetic heads A2 and B2 disposed in the vicinity of each other record the signals simultaneously, sound tracks A and B (shown in FIG. 13A) are formed by sound magnetic heads 3A and 3B (both not shown) which go ahead of the magnetic heads. Further, it is also possible to obtain another magnetic tape pattern as shown in FIG. 13B, by appropriately determining the mounting heights of the magnetic heads A1, A2, B1 and B2 and the sound magnetic heads 3A and 3B, respectively.

As described above, in the present embodiment, with respect to the recording system, it is possible to emphasis the input Y signal cc, the input PB signal dd and the input PR signal ee independently in the time direction, the vertical direction and the non-linear horizontal direction. In addition, it is possible to record the video signals independently emphasized in the linear horizontal direction on the magnetic tape.

Further, since there are no video signals during the blanking signal period (in which the information signals related to the 603 or 604 line are interposed), there exists no correlation between the time direction and the vertical direction, so that it is not appropriate to implement the time direction emphasis and the vertical direction emphasis. In the present embodiment, however, since the blanking signals are interposed with the use of the first and second selectors 26 and 27, there exists such an effect that the time direction emphasis and the vertical direction emphasis are both not implemented.

(Reproducing System)

The reproducing system will be described hereinbelow with reference to FIG. 14. In the drawing, the signals reproduced from the magnetic tape TT by the magnetic heads A1 and A2 or the magnetic heads B1 and B2 are amplified by preamplifiers (not shown), and then applied to. FM demodulators (DE MOD) 34 and 35, respectively. The FM demodulated signals are applied to linear horizontal direction deemphasizers (DE LHE) 36 and 37, respectively. The linear horizontal direction deemphasizers 36 and 37 (which are both complementary to the linear horizontal direction emphasizers 30 and 31, respectively) apply the first and second reproduced signals 36a and 37a (in which noise of the high frequency components generated by the tape heads, in particular are suppressed) to first and second TCI inverters (Time Compensated Integration Decoders) 41 and 42 via A/D converters 38 and 39, respectively. Further, the first reproduced signal 36a is applied to timing generator (TG) 40. Further, the timing generator 40 is constructed in the same way as with the case of the timing generator 8, which supplies a control signal 40a at least to a time direction deemphasizers (DE TE) 52 to 54 and vertical direction deemphasizers (DE VE) 49 to 51, respectively for control of these circuits.

First and second TCI inverters 41 and 42 expand the compressed Y signals related to the first and second reproduced signals 36a and 37a, respectively, and further expand the compressed line sequence chrominance signals line by line, respectively to obtain the first and second reproduced Y signals 41a and 42a and the first and second reproduced line sequence chrominance signals 41b and 42b. The first and second reproduced Y signals 41a and 42a are applied to a synthesizer 45. Further, the first and second reproduced line sequence chrominance signals 41b and 42b are applied to first and second line sequence inverters 43 and 44 of a line sequence inverter AA, respectively.

Figure 18:
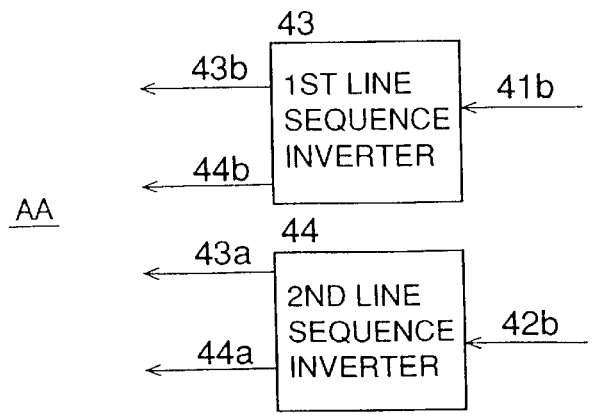
FIG. 18 is a block diagram showing an example of the line sequence inversion processing, which corresponds to a second mode of the line sequence conversion processing according to the present invention.
Figure 19A:
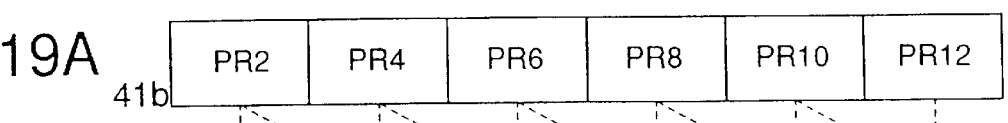
FIGS. 19A and 19B are conceptual diagrams for assistance in explaining still another example of the line sequence inversion processing, which corresponds to the second mode of the line sequence conversion processing according to the present invention.
Figure 19B:
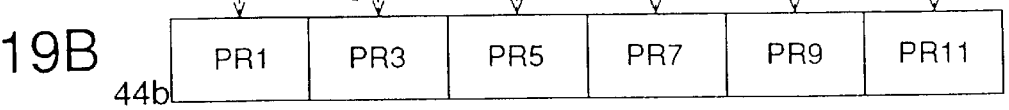

The first and second line sequence inverters 43 and 44 form the first reproduced PB and PR signals 43a and 43b and the second reproduced PB and PR signals 44a and 44b, respectively on the basis of the first and second reproduced line sequence chrominance signals 41b and 42b, and further apply these formed signals to the synthesizer 45. The processing of the line sequence inversion will be described hereinbelow with reference to FIGS. 15 to 19, in which the English characters represent the sorts of the signals and the numerals designate the line numbers of the HD signals. Further, the line sequence inverter AA shown in FIG. 14 is an example which corresponds to the first mode of the line sequence converting processing. The line sequence inverter AA shown in FIG. 17 is another example which corresponds to the first mode of the line sequence converting processing. The line sequence inverter AA shown in FIG. 19 is an example which corresponds to the second mode of the line sequence converting processing, respectively.

The example corresponding to the first mode will be described with reference to FIG. 15. The first reproduced line sequence chrominance signal 41b as shown in FIG. 15A is applied to the first line sequence inverter 43 of the line sequence inverter AA shown in FIG. 14, by which an average value of the PR signals related to the lines of even numbers interposed every two lines is obtained to form the PR signals erased for the line sequence processing. Further, the signals erased and the signal not erased are synthesized to form the first reproduced PR signal 43b as shown in FIG. 15B. In the same way as with the case of the first reproduced PR signal 43b, the first reproduced PB signal 43a as shown in FIG. 15D is formed on the basis of the first reproduced line sequence chrominance signal 41b as shown in FIG. 15C. Further, the second line sequence inverter 44 operates in quite the same way as with the case of the first line sequence inverter 43.

Figure 16:
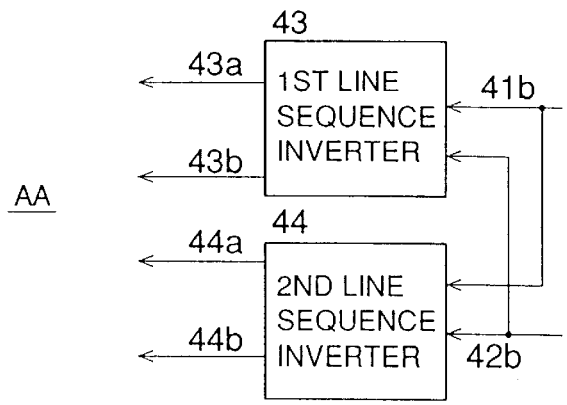
FIG. 16 is a block diagram showing another example of the line sequence invention processing, which corresponds to the first mode of the line sequence conversion processing according to the present invention.
Figure 17A:
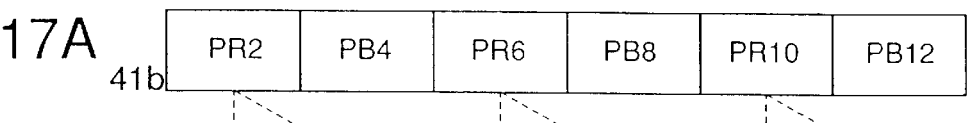
FIGS. 17A to 17C are conceptual diagrams for assistance in explaining still another example of the line sequence invention processing, which corresponds to the first mode of the line sequence conversion processing according to the present invention.
Figure 17B:
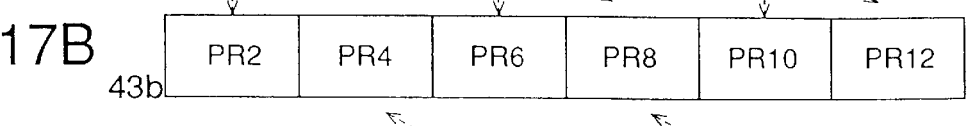
Figure 17C:
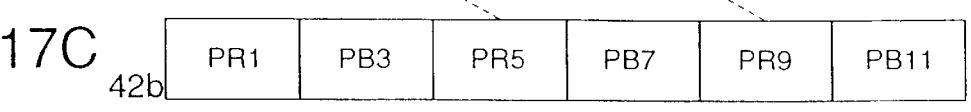

Another example which corresponds to the first mode will be described with reference to FIGS. 16 and 17. The line sequence inverter AA shown in FIG. 16 is different from the line sequence inverter AA shown in FIG. 14 in that the first and second reproduced line sequence chrominance signals 41b and 42b are applied to both the first and second line sequence inverters 43 and 44, respectively. In more detail, the first and second reproduced line sequence chrominance signals 41b and 42b as shown in FIGS. 17A and 17C are applied to the first line sequence inverter 43, and the first reproduced PR signal 43b as shown in FIG. 17B is formed on the basis of these signals. In other words, the line erased in the line sequence processing can be formed by use of the upper and lower lines closest to the erased line. In this case, an average value of the upper and lower lines closest to the erased line is used. However, it is also preferable to obtain a weighted average by determining the coefficient of the closest line (e.g., PR5) larger than that of another line (e.g., PR2).

An example which corresponds to the second mode will be described with reference to FIGS. 18 and 19. The line sequence inverter AA shown in FIG. 18 is different from the line sequence inverter AA as shown in FIG. 14 in that the second reproduced PR signal 44b is outputted by the first line sequence inverter 43 and further the first reproduced PB signal 43a is outputted by the second line sequence inverter 44. In more detail, the first reproduced line sequence chrominance signal 41b as shown in FIG. 19A is applied to the first line sequence inverter 43; this signal is outputted as the first PR signal 43b as it is; and an average value of the two adjacent lines of first reproduced line sequence chrominance signal 41b related to the even lines is obtained to output the second reproduced line sequence chrominance signal 44b related to the odd lines.

Figure 14:
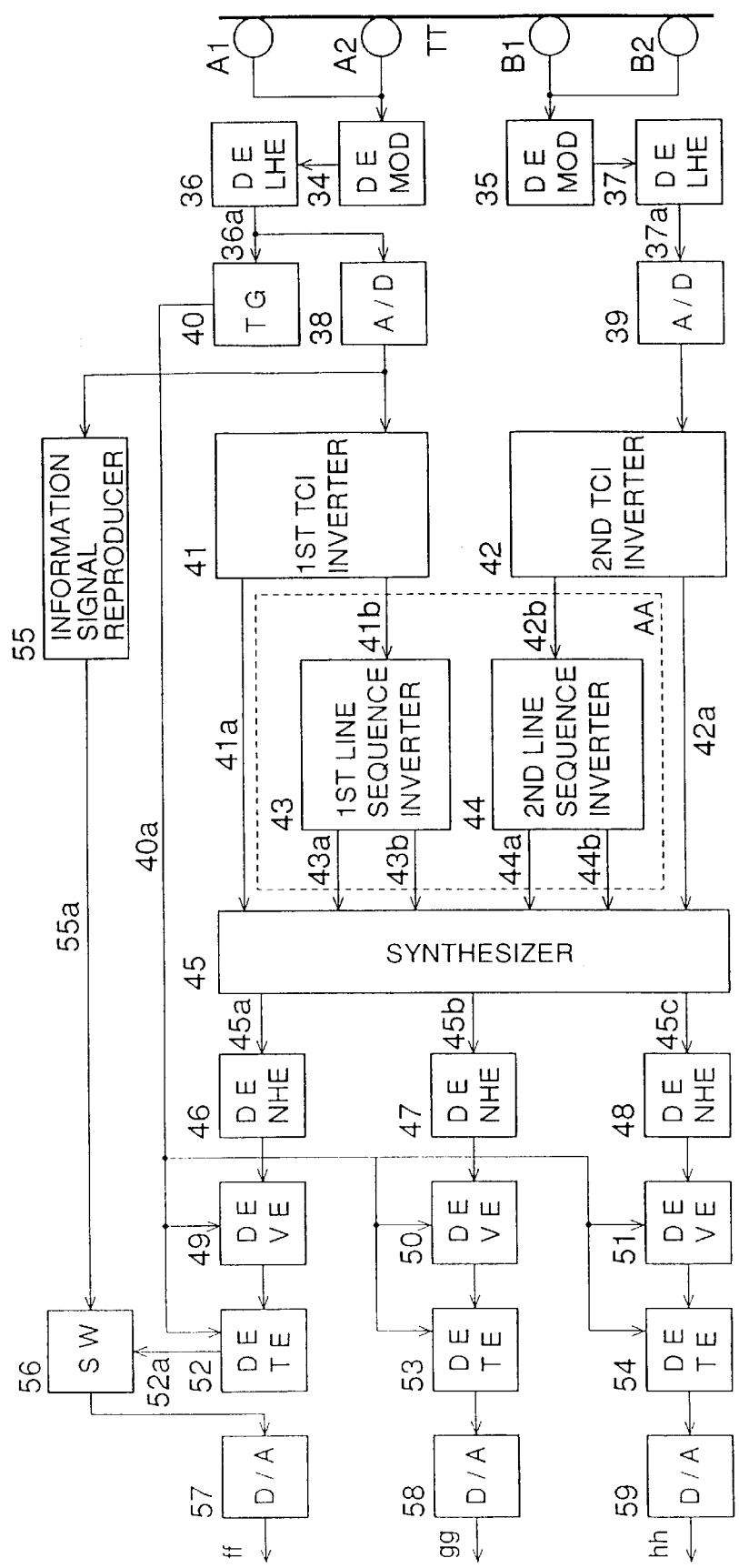
FIG. 14 is a block diagram showing a second embodiment according to the present invention, which is applied to a magnetic reproducing apparatus.
Figure 15A:
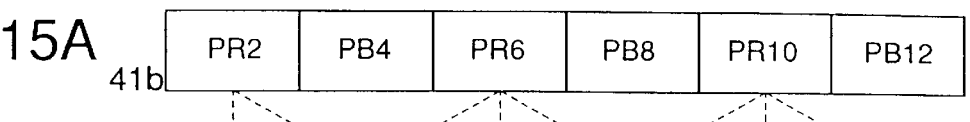
FIGS. 15A to 15D are conceptual diagrams for assistance in explaining an example of the line sequence invention processing, which corresponds to a first mode of the line sequence conversion processing according to the present invention.
Figure 15B:
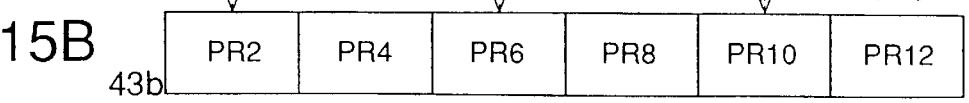
Figure 15C:
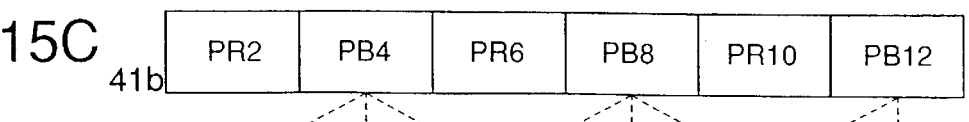
Figure 15D:
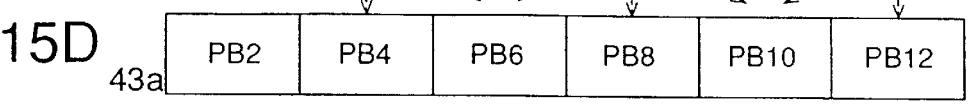

Further, the synthesizer 45 shown in FIG. 14 synthesizes the first reproduced Y, PB and PR signals 41a, 43a and 43b related to the even lines with the second reproduced Y, PB and PR signals 42a, 44a and 44b related to the odd lines, to obtain the reproduced Y, PB and PR signals 45a to 45c, respectively. Further, the reproduced Y, PB and PR signals 45a to 45c are first applied to non-linear horizontal direction deemphasizers (DE NHE) 46 to 48 for implementing the non-linear deemphasis in the horizontal direction. Thereafter, the linear and/or non-linear deemphasis is implemented in the vertical direction by the vertical direction deemphasizers 49 to 51, respectively and further the linear and/or non-linear deemphasis is implemented in the time direction by the time direction deemphasizers 52 to 54, respectively.

Further, the output signals of the time direction deemphasizers 53 and 54 are applied to D/A converters 58 and 59, respectively to obtain the PB and PR signals gg and hh. These output signals gg and hh are applied to transmission lines (not shown). On the other hand, the output signal 52a of the time direction deemphasizer 52 is applied to a selector 56 to obtain the Y signal ff in which the reproduced information signal 55a (described later) is interposed in the 603 line. The signal ff is outputted to a transmission line (not shown) via a D/A converter 57.

Information signal reproducer for reproducing the reproduced information signal 55a will be described hereinbelow. The output signal of the A/D converter 38 is applied to the information signal reproducer 55, and the level of the applied signal is compared with a predetermined threshold value to discriminate whether the reproduced TCI information signal related to the applied signal is "0" or "1". The time axis of the information signal is expanded to form the reproduced information signal 55a.

As described above, in the magnetic reproducing apparatus according to the present embodiment, since the first reproduced signal 36a in which the high frequency noise components are suppressed by the linear horizontal direction deemphasizer 34 is first obtained and thereafter the vertical and time direction deemphasizers 49 to 54 are controlled on the basis of the control signal 40a formed on the basis of the obtained first reproduced signal 36a, there exists such an effect that it is possible to securely implement the deemphases without erroneous operation. In addition, since the non-linear horizontal direction deemphasis, the vertical direction deemphasis and the time direction deemphasis are disposed at the stage prior to the final output, it is possible to suppress not only the noise generated by the tape head system corresponding to the transmission line but also the noise generated between the divider 21 of the recording system and the synthesizer 45 of the reproducing system. That is, for instance, it is possible to suppress the noise generated due to rounding-off error generated when the line sequence inverters 43 and 44 execute the arithmetic operation.

Further, in the recording and reproducing apparatus according to the present invention, even when the HD signal in which information signal is interposed in the 603 line is recorded, there exists such an effect that the information signal can be recorded in the magnetic tape, in spite of the fact that only 1032 lines in the scanning lines of the HD signals are recorded. Therefore, when the magnetic tape is reproduced, since the HD signal in which the reproduced information signal is interposed in the 603 line can be outputted, there exists such an effect that it is possible to easily control the rear-stage high-vision apparatus (e.g., control of the amplitude level) on the basis of the reproduced information signal.

(3rd Embodiment)

Figure 20:
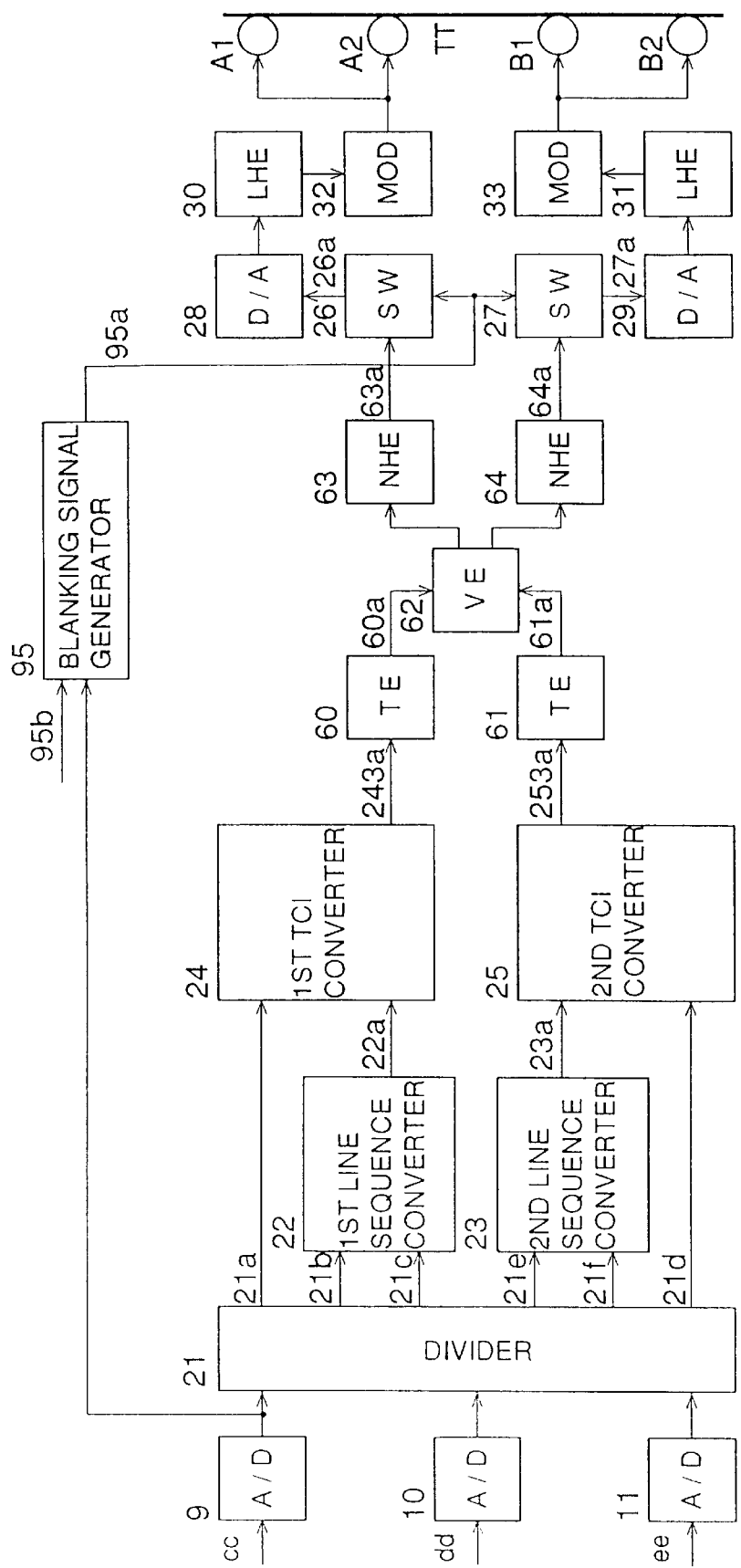
FIG. 20 is a block diagram showing a third embodiment according to the present invention, which is applied to another magnetic recording apparatus.

The recording system related to the third embodiment will be described hereinbelow with reference to FIG. 20. Further, the same reference numerals have been retained for the similar circuits which have the same functions as with the case of the second embodiment shown in FIG. 9, without repeating any detailed description thereof. In FIG. 20, the first and second TCI (Time Compensated Integration) signals 243a and 253a converted by the first and second TCI converters (Time Compensated Integration Encoders) 24 and 25 are first applied to time direction emphasizers 60 and 61, respectively to implement the linear and/or non-linear emphasis in the time direction.

Further, the two group signals 60a and 61a are applied from the time direction emphasizers 60 and 61 to the vertical direction emphasizer 62 (which is common for both two groups), to synthesize these two system signals 60a and 61a, to implement the linear and/or non-linear emphasis in the vertical direction, and further to divide the emphasized signals into two groups. Here, the reason why the common vertical direction emphasizer 62 is used is that since the signals are divided into the signals 21a to 21c related to even lines and the signals 21d to 21f related to the odd lines by the divider 21, it is necessary to implement the vertical direction emphasis after these signals have once been synthesized in the order of the normal lines under due consideration of the information of the adjacent lines having a high correlation with respect to each other.

Further, the output signal of the vertical direction emphasizer 62 is applied to the non-linear horizontal direction emphasizers 63 and 64, respectively to implement the non-linear emphases in the horizontal direction, respectively. The obtained output signals 63a and 64a are applied to one input of each of the first and second selectors 26 and 27, respectively. These signals 63a and 64a are equivalent to the first and second TCI signals 24a and 25a described in the second embodiment. These signals 63a and 64a are synthesized with the blanking signal 95a applied from the blanking signal generator 95 to the other inputs of the first and second selectors 26 and 27, respectively to form the first and second recording signals 26a and 27a as shown in FIG. 20. Further, the same processing as with the case of the second embodiment is implemented for the first and second recording signals 26a and 27a by the circuits 28 to 33, and then recorded on the magnetic tape TT through the magnetic heads A1 and A2 or B1 and B2.

Further, with respect to the line sequence processing implemented by the first and second line sequence converters 22 and 23, although the input signals are selected for each line alternately, in the same way as with the case of the first embodiment, it is also possible to form the first and second line sequence chrominance signals 22a and 23a, respectively by always selecting only the first PB signal 21b by the first line sequence converter 22 and only the second PR signal 21f by the second line sequence converter 23.

As described above, in the magnetic recording apparatus according to the present invention, since the various emphases can be implemented according to the conditions of the TCI signals, it is possible to reduce the number of the time direction emphasizers and the non-linear horizontal direction emphasizers from three to two and in addition the number of the vertical direction emphasizers from three to one, respectively as compared with the second embodiment, thus simplifying the construction of the apparatus.

Further, since the period of the blanking signal having the information signal related to the 603 or 604 line is not the video signal, there exists no correlation between the vertical direction and the time direction, so that it is not appropriate to implement the time direction emphasis and the vertical direction emphasis. In this embodiment, however, since the blanking signal is interposed by the first and second selectors 26 and 27, there exists such an effect that the emphasis is not implemented in both the time and vertical directions.

Figure 21:
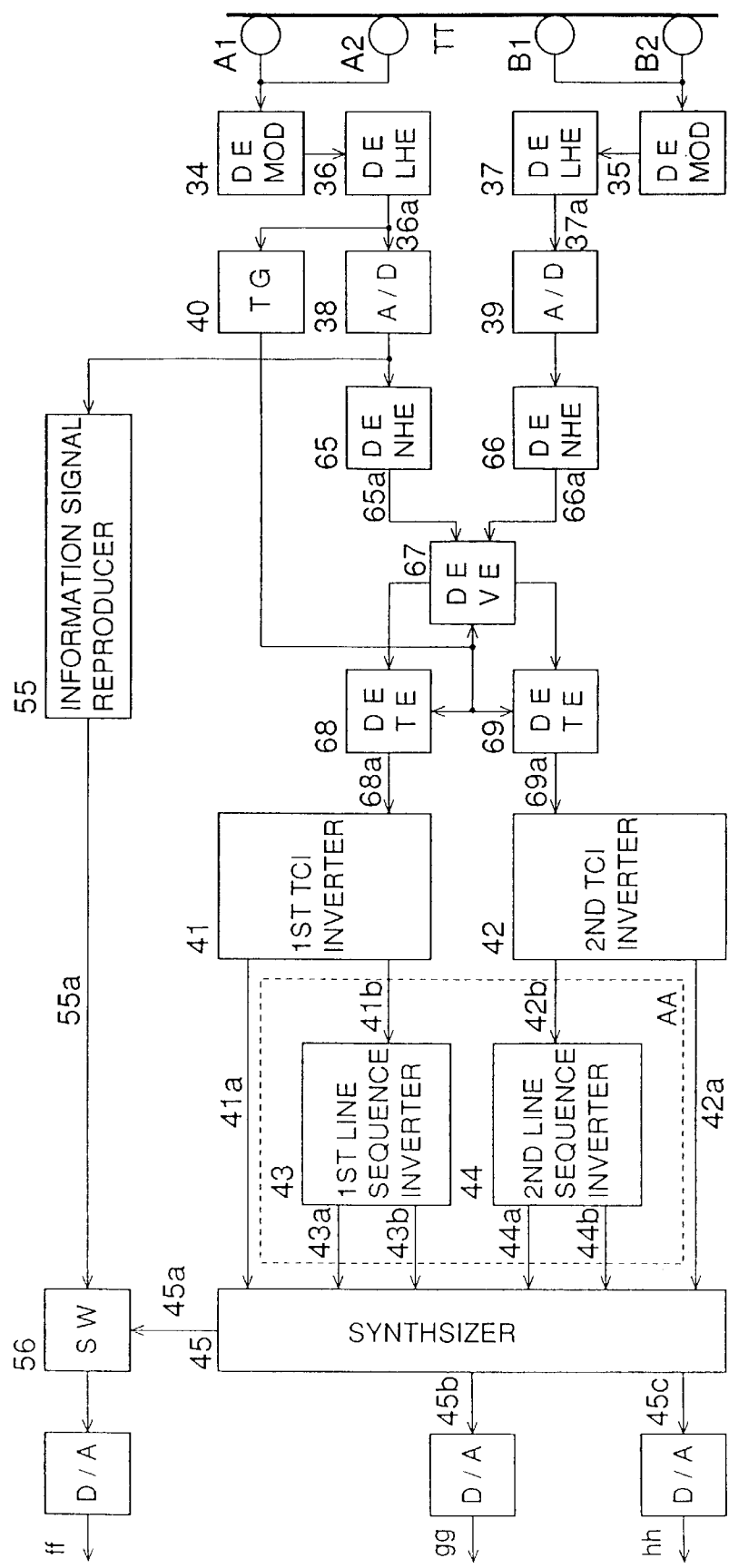
FIG. 21 is a block diagram showing a third embodiment according to the present invention, which is applied to another magnetic reproducing apparatus.

The reproducing system related to the third embodiment will be described hereinbelow with reference to FIG. 21. Further, the same reference numerals have been retained for the similar circuits which have the same functions as with the case of the second embodiment shown in FIG. 14, without repeating any detailed description thereof. In FIG. 21, the reproduced signals are applied to the linear horizontal direction deemphasizers 36 and 37 to implement the linear deemphases in the horizontal direction. The output signals 36a and 37a of the deemphasizers 36 and 37 are applied to the non-linear horizontal direction deemphasizers (DE NHE) 65 and 66 via the A/D converters 38 and 39, respectively. Further, the output signal 36a of the deemphasizer 36 is applied to the timing generator 40. The non-linear horizontal direction deemphasizers 65 and 66 further implements the non-linear deemphases in the horizontal direction. Further, the signals 65a and 66a are synthesized by the vertical direction deemphasizer 67 which is complementary to the vertical direction emphasizer 63 and further used in common for both the signal groups. The synthesized signal is further linear and/or non-linear deemphasized in the vertical direction, and then divided into two groups again. Thereafter, the divided signals are applied to the time direction deemphasizers 68 and 69 to implement the linear and/or non-linear deemphases in the time direction, respectively.

Here, the reason why the vertical direction deemphasizer 67 is used in common for both the groups is that since the signals are divided into the signals 21a to 21c related to the even lines and the signals 21d to 21f related to the odd lines by the divider 21 of the recording system, it is necessary to implement the vertical direction emphasis after having been synthesized in the order of the normal lines.

Further, the signals 68a and 69a to which various deemphases have been implemented are applied to the first and second TCI inverters (Time Compensated Integration Decoders) 41 and 42, respectively, and the same processing as with the case of the second embodiment is executed by the circuits 41 to 45.

Further, the output signals 45b and 45c of the synthesizer 45 are applied to the D/A converters 58 and 59, respectively. The PB signal gg and the PR signal hh of the D/A converters 58 and 59 are applied to transmission lines (not shown), respectively. On the other hand, the output signal 45a is applied from the synthesizer 45 to the selector 56, by which the Y signal ff in which the reproduced information signal is interposed in the 603 line is obtained. The obtained Y signal ff is outputted to a transmission line (not shown) via the D/A converter 57.

As described above, in the reproducing apparatus according to the present invention, since the various deemphases are implemented according to the conditions of the TCI signals, it is possible to reduce the number of the time direction deemphasizers and the non-linear horizontal direction deemphasizers from three to two and in addition the number of the vertical direction deemphasizers from three to one, respectively, as compared with the second embodiment, thus simplifying the construction of the apparatus.

(4th Embodiment)

Figure 22:
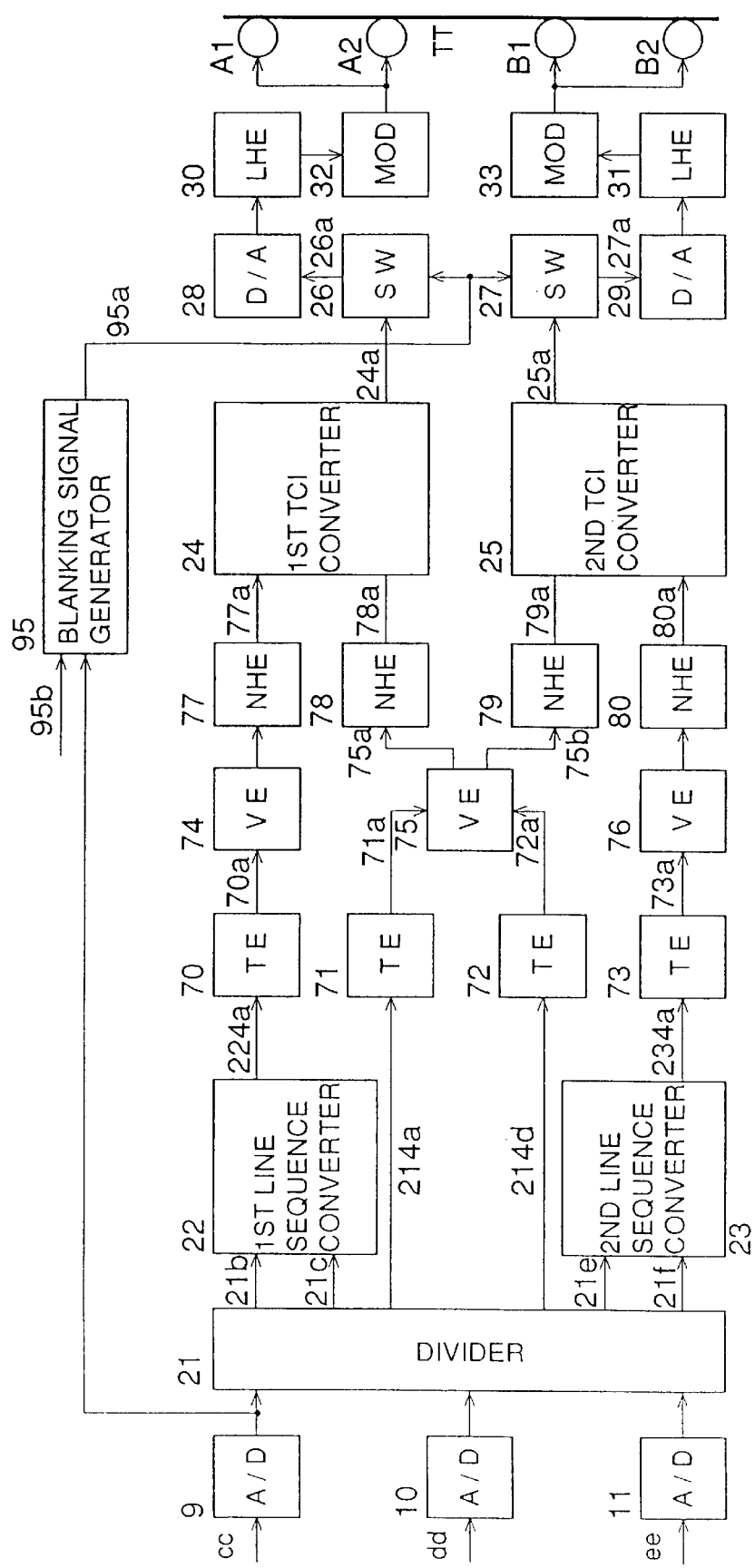
FIG. 22 is a block diagram showing a fourth embodiment according to the present invention, which is applied to the other magnetic recording apparatus.

The recording system related to the fourth embodiment will be described hereinbelow with reference to FIG. 22, in which the same reference numerals have been retained for the similar circuits which have the same functions as with the case of the second embodiment shown in FIG. 9. In FIG. 22, the first and second line sequence chrominance signals 224a and 234a outputted by the first and second line sequence converters 22 and 23 and the first and second Y signals 214a and 214d outputted by the divider 21 are applied to the time direction emphasizers 70 and 73 and the time direction emphasizers 71 and 72, respectively to implement the linear and/or non-linear emphases in the time direction, respectively. Further, the first line sequence converter 22 always selects only the first PB signal 21b to output the first line sequence chrominance signal 224a, and the second line sequence converter 23 always selects only the second PR signal 21f to output the second line sequence chrominance signal 234a, respectively. This line sequence processing corresponds to the second mode.

Further, the output signals 70a and 73a of the time direction emphasizers 70 and 73 for the first and second line sequence chrominance signals 224a and 234a are applied to the vertical direction emphasizers 74 and 76 to implement the linear and/or non-linear emphases in the vertical direction, respectively and further to the non-linear horizontal direction emphasizers 77 and 80 to implement the non-linear emphases in the horizontal direction, respectively. The output signals 77a and 80a of these non-linear horizontal direction emphasizers 77 and 80 are applied to one input of each of the first and second TCI converters (Time Compensated Encoders) 24 and 25, respectively.

On the other hand, the output signals 71a and 72a of the time direction emphasizers 71 and 72 for the first and second Y signals 214a and 124d are applied to the common vertical direction emphasizer 75 to synthesize both the signals in the order of lines and further to implement the linear and/or non-linear emphasis in the vertical direction. The emphasized signals are further divided again into the signals 75a related to the even lines and the signals 75b related to the odd lines, respectively. The divided signals 75a and 75b are applied to the non-linear horizontal direction emphasizers 78 and 79 to implement the non-linear emphases in the horizontal direction. The output signals 78a and 79a of the non-linear horizontal direction emphasizers 78 and 79 are applied to the first and second TCI converters 24 and 25, respectively.

Here, the reason why the vertical direction emphasizer 75 is used in common for both the signals 71a and 72a is that since the signals are divided by the divider 21 into the first Y signals 214a related to the even lines and the second signals 214d related to the odd lines, it is necessary to implement the vertical direction emphasis after these signals have been synthesized in the order of the normal lines. On the other hand, the reason why the two vertical direction emphasizers 74 and 75 are provided for the first and second line sequence chrominance signals 224a and 234a, respectively is that the first and second line sequence chrominance signals 22a and 23a are the first PB signal 21b and the second PR signal 21f, respectively. Further, the signals 77a and 79a and the signals 78a and 80a are equivalent to the first and second line sequence chrominance signals 22a and 23a and the first and second Y signals 21a and 21d, respectively.

Further, the signals processed by the circuits 24 to 33 in the same way as with the case of the second embodiment are recorded on the magnetic tape TT through the magnetic heads A1 and A2 or B1 and B2.

As described above, in the magnetic recording apparatus of the present embodiment, since the luminance signal and the chrominance signals are emphasized independently, there exists such an effect that it is possible to emphasis these signals according to the characteristics of these signals, respectively.

Further, since there is no video signal during the blanking signal period (in which the information signal related to the 603 or 604 line is interposed), there exists no correlation between the time direction and the vertical direction, so that it is not appropriate to implement the time direction emphasis and the vertical direction emphasis. In the present embodiment, however, since the blanking signals are interposed with the use of the first and second selectors 26 and 27, there exists such an effect that the time direction emphasis and the vertical direction emphasis are not implemented.

Figure 23:
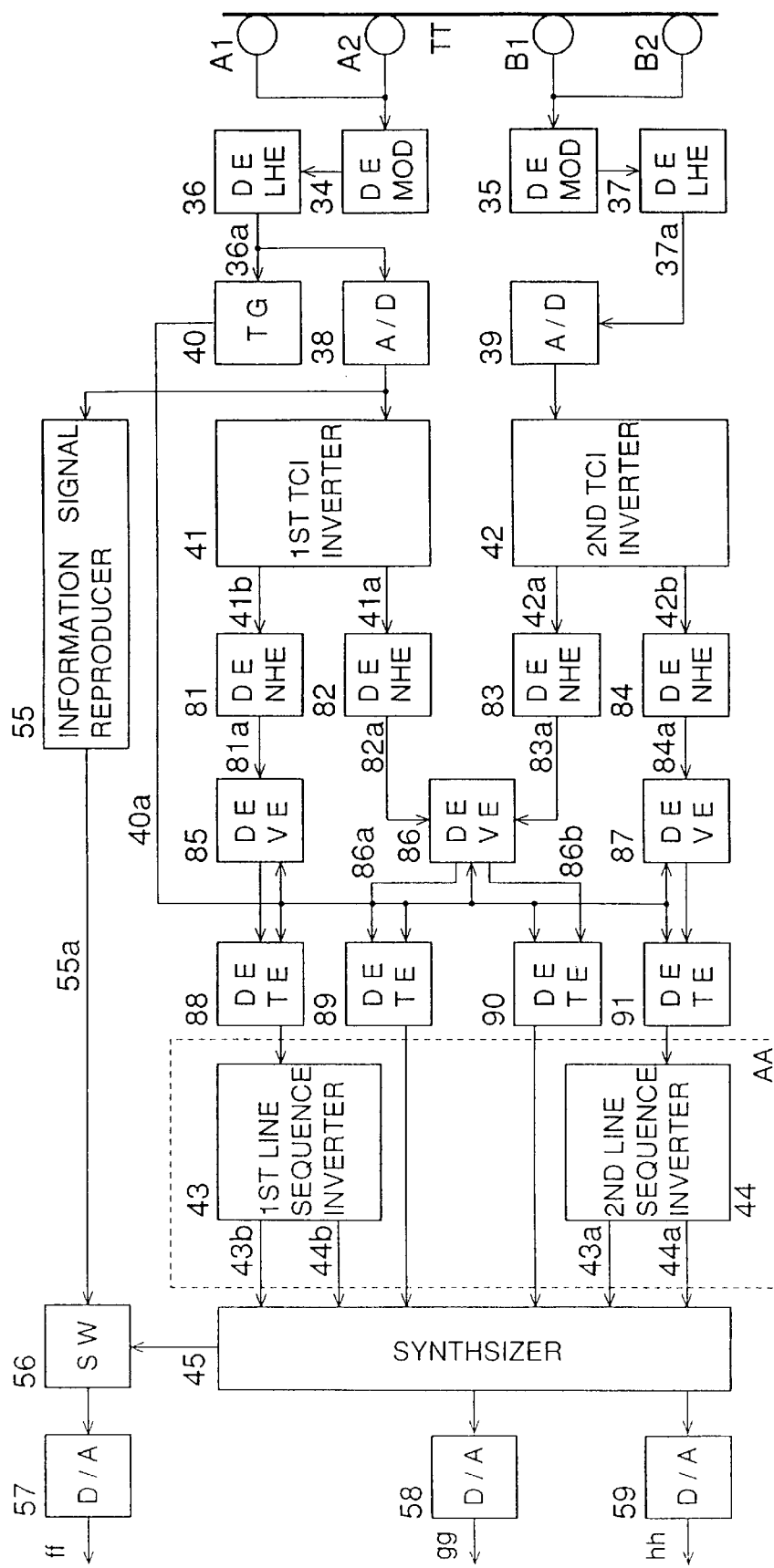
FIG. 23 is a block diagram showing a fourth embodiment according to the present invention, which is applied to the other magnetic reproducing apparatus.

The reproducing system related to the fourth embodiment will be described hereinbelow with reference to FIG. 23, in which the same reference numerals have been retained for the similar circuits which have the same functions as with the case of the second embodiment shown in FIG. 14, without repeating any detailed description thereof. In FIG. 23, the reproduced signals are applied to the linear horizontal deemphasizers 36 and 37 to implement the linear deemphases in the horizontal direction. The output signal 36a of the linear horizontal deemphasizer 36 is applied to the timing generator 40 to form the control signal 40a. The vertical direction deemphasizers 85 to 87 (described later) are controlled on the basis of this control signal 40a.

The first reproduced line sequence chrominance signals 41b and 42b formed by the first and second TCI inverters (Time Compensated Integration Decoders) 41 and 42, respectively are applied to the non-linear horizontal deemphasizers 81 and 84, respectively to first implement the non-linear deemphases in the horizontal direction. The output signals 81a and 84a of the non-linear horizontal direction deemphasizers 81 and 84 are applied to the vertical direction deemphasizers 85 and 87 to implement the linear and/or non-linear deemphases in the vertical direction. The outputs of the vertical direction deemphasizers 85 and 87 are applied to the time direction deemphasizers 88 and 91 to implement the linear and/or non-linear deemphases in the time direction. Thereafter, the deemphasized signals are applied to the first and second line sequence inverters 43 and 44, respectively.

On the other hand, the first and second reproduced Y signals 41a and 42a formed by the first and second TCI inverters 41 and 42 are applied to the non-linear horizontal direction deemphasizers 82 and 83 to first implement the non-linear deemphases in the horizontal direction. Further, the output signals 82a and 83a of the non-linear horizontal direction deemphasizers 82 and 83 are applied to the common vertical direction deemphasizer 86, to synthesize the output signals 82a and 83a in the order of lines, to implement the linear and/or non-linear deemphasis in the vertical direction, and further to divide the signals again into the output signals 86a related to the even lines and the output signals 86b related to the odd lines. Thereafter, the signals 86a and 86b are applied to the time direction deemphasizers 89 and 90 to implement the linear and/or non-linear deemphases in the time direction.

Here, the reason why the vertical direction deemphasizer 86 is used in common for both the signals 82a and 83a is that since the signals are divided by the divider 21 of the recording system of the fourth embodiment into the first Y signals 214a related to the even lines and the second signals 214d related to the odd lines, it is necessary to implement the vertical direction emphasis after these signals have been synthesized in the order of the normal lines. On the other hand, the reason why the two vertical direction deemphasizers 85 and 87 are provided for the first and second reproduced line sequence chrominance signals 41b and 42b, respectively is that the first and second line sequence chrominance signals 41b and 42b are related to the first PB signal 21b and the second PR signal 21f respectively, which are different from each other in the sorts of signals. Further, in the reproducing system of the present invention, since the luminance signal and the chrominance signals are deemphasized independently, there exists such an effect that it is possible to implement the deemphasis according to the characteristics of the respective signals.

Further, in the above-mentioned second to fourth embodiments, it is also preferable to implement not only the linear horizontal direction emphasis but also non-linear horizontal direction emphasis by the linear horizontal direction emphasizer 30. In this case, it is of course possible to omit the front-stage non-linear horizontal direction emphasizers 18 to 20, 63 and 64, 77 to 80, respectively. Further, in the above-mentioned second to fourth embodiments, it is also preferable to implement not only the linear horizontal direction deemphasis but also non-linear horizontal direction deemphasis by the linear horizontal direction deemphasizer 31. In this case, it is of course possible to omit the front-stage non-linear horizontal deemphasizers 46 to 48, 65 and 66, and 81 to 84, respectively.

Further, in the above-mentioned second to fourth embodiments, all the circuits from the A/D converters 9 to 11 to the input of the divider 21 are operated in response to a first clock signal. The frequency of this first clock signal is determined to be 896 times (i.e., 30. 24 MHz) higher than the horizontal frequency of the HD signal under consideration of the frequency band of the HD signal. Further, all the circuits from the output of the divider 21 to the inputs of the first and second TCI converters 24 and 25 are operated in response to a second clock signal. The frequency of this second clock signal is determined to be 910 times (i.e., 14. 3325 MHz) higher than the horizontal frequency of the NTSC signal. Further, all the circuits after the outputs of the first and second TCI converters 24 and 25 are operated in response to a third clock signal. The frequency of this third clock signal is determined to be 1092 times (i.e., 17. 199 MHz) higher than the horizontal frequency of the NTSC signal. On the other hand, the circuits from the A/D convertors 38 and 39 to the inputs of the first and second TCI inverters 41 and 42 are operated in response to the third clock. Further, the circuits from the outputs of the first and second TCI inverters 41 and 42 to the input of the synthesizer 45 are operated in response to the second clock signals. Further, the circuits from the output of the synthesizer 45 to the D/A converters 57 to 59 are operated in response to the first clock signal.

Further, in the above-mentioned embodiments, although the VTR using the magnetic tape as the recording medium has been described as an example of the video signal recording and reproducing apparatus, without being limited thereto, the present invention can be of course applied to the video signal recording and reproducing apparatus having an optical disk or a floppy disk as the recording medium or a semiconductor memory.

Further, in the above-mentioned embodiments, although the video signal recording and reproducing apparatus has been described, without being limited thereto, the video signal emphasis method according to the present invention can be of course applied to only the recording system (i.e., on the transmission side) and the video signal deemphasis method according to the present invention can be of course applied to only the reproducing system (i.e., on the reception side).

As described above, in the video signal emphasis method according to the present invention, since the emphases are implemented in the order of the time, vertical and horizontal directions, it is possible to effectively utilize the dynamic range of the transmission line, so that there exists such an effect that video signals can be transmitted and outputted without being clipped.

Further, in the video signal deemphasis method according to the present invention, since the deemphases are implemented in the order of the horizontal, vertical and time directions, it is possible to implement the vertical direction and the time direction deemphases on the basis of the control signal formed in accordance with the horizontal direction deemphasis output in which the high frequency noise components generated in the transmission line can be suppressed to some extent, with the result that there exists such an effect that accurate deemphases can be implemented without causing any erroneous operation.

What is claimed is:

1. A video signal emphasis method used for obtaining a plurality of groups of time compensated integration (TCI) signals by dividing a plurality of video signals into a plurality of groups, and compressing and multiplexing the divided video signals of groups per line, the method comprising the steps of:

emphasizing levels of high frequency components of the video signals of the groups in a time direction except during a blanking signal period, relative to low frequency components thereof;

emphasizing levels of high frequency components of the time-direction emphasized video signals of the groups in a vertical direction except during the blanking signal period, relative to low frequency components thereof;

emphasizing levels of high frequency components of the vertical-direction emphasized video signals of the groups in a horizontal direction using non-linear horizontal emphasis for varying emphasis of the high frequency components in accordance with the levels of the vertical-direction emphasized video signals of the groups, relative to low frequency components thereof;

dividing the non-linearly horizontal-direction emphasized video signals into a plurality of groups;

obtaining a plurality of groups of TCI signals by compressing and multiplexing the divided video signals of groups per line; and emphasizing levels of high frequency components of the TCI signals of groups in the horizontal direction using linear horizontal emphasis, relative to low frequency components thereof.

2. The method of claim 1, wherein the time direction emphasis and the vertical direction emphasis are both non-linear emphasis each for emphasizing the levels of the high frequency components variably according to the levels of signals input thereto.

3. A video signal emphasis method used for obtaining a plurality of groups of time compensated integration (TCI) signals by dividing a plurality of video signals into a plurality of groups, and compressing and multiplexing the divided video signals of groups per line, the method comprising the steps of:

dividing the plurality of video signals into a plurality of groups;

obtaining a plurality of groups of TCI signals by compressing and multiplexing the divided plurality of video signals per line;

emphasizing levels of high frequency components of the TCI signals of the groups in a time direction except during a blanking signal period, relative to low frequency components thereof;

emphasizing levels of high frequency components of the time-direction emphasized TCI signals of the groups in a vertical direction except during the blanking signal period, relative to low frequency components thereof;

emphasizing levels of high frequency components of the vertical-direction emphasized TCI signals of the groups in a horizontal direction using non-linear horizontal emphasis for varying emphasis of the high frequency components in accordance with the levels of the vertical-direction emphasized TCI signals of the groups, relative to low frequency components thereof; and emphasizing levels of high frequency components of the non-linearly horizontal-direction emphasized TCI signals of groups in the horizontal direction using linear horizontal emphasis, relative to low frequency components thereof.

4. The method of claim 3, wherein the time direction emphasis and the vertical direction emphasis are both non-linear emphasis each for emphasizing the levels of the high frequency components variably according to the levels of signals input thereto.

5. A video signal emphasis method used for obtaining a plurality of groups of time compensated integration (TCI) signals by dividing a plurality of video signals into a plurality of groups, and compressing and multiplexing the divided video signals of groups per line, the method comprising the steps of:

dividing the plurality of video signals into a plurality of groups;

emphasizing levels of high frequency components of the video signals of the groups in a time direction except during a blanking signal period, relative to low frequency components thereof;

emphasizing levels of high frequency components of the time-direction emphasized video signals of the groups in a vertical direction except during the blanking signal period, relative to low frequency components thereof;

emphasizing levels of high frequency components of the vertical-direction emphasized video signals of the groups in varying emphasis of the high frequency components in accordance with the levels of the vertical-direction emphasized video signals of the groups, relative to low frequency components thereof;

obtaining a plurality of groups of TCI signals by compressing and multiplexing the non-linearly horizontal-direction emphasized video signals of the groups; and emphasizing levels of high frequency components of the TCI signals of groups in the horizontal direction using linear horizontal emphasis, relative to low frequency components thereof.

6. The method of claim 5, wherein the time direction emphasis and the vertical direction emphasis are both non-linear emphasis each for emphasizing the levels of the high frequency components variably according to the levels of signals input thereto.

7. A video signal deemphasis method used for a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the method comprising the steps of:

deemphasizing levels of high frequency components of the TCI signals of groups in a horizontal direction using linear horizontal deemphasis, relative to low frequency components thereof;

generating a control signal on the basis of synchronizing signals included in the linearly horizontal-direction deemphasized TCI signals of the groups;

obtaining the divided plurality of video signals by decompressing the linearly horizontal-direction deemphasized TCI signals of the groups per line;

obtaining the plurality of video signals by composing the divided plurality of video signals;

deemphasizing levels of high frequency components of the plurality of the video signals in the horizontal direction using non-linear horizontal emphasis for varying emphasis of the high frequency components in accordance with the levels of the plurality of the video signals, relative to low frequency components thereof;

deemphasizing levels of high frequency components of the non-linearly horizontal-direction deemphasized plurality of video signals in a vertical direction using the control signal, relative to low frequency components thereof; and deemphasizing levels of high frequency components of the vertical-direction deemphasized plurality of video signals in a time direction using the control signal, relative to low frequency components thereof.

8. The method of claim 7, wherein the time direction deemphasis and the vertical direction deemphasis are both non-linear deemphasis each for deemphasizing the levels of the high frequency components variably according to the levels of signals input thereto.

9. A video signal deemphasis method used for obtaining a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the method comprising the steps of:

deemphasizing levels of high frequency components of the TCI signals of groups in a horizontal-direction using linear horizontal deemphasis, relative to low frequency components thereof;

generating a control signal on the basis of synchronizing signals included in the linearly horizontal-direction deemphasized TCI signals of the groups;

deemphasizing levels of high frequency components of the linearly horizontal-direction deemphasized TCI signals of groups in the horizontal direction using non-linear horizontal emphasis for varying emphasis of the high frequency components in accordance with the levels of the plurality of the TCI signals of groups, relative to low frequency components thereof;

deemphasizing levels of high frequency components of the non-linearly horizontal-direction deemphasized TCI signals of groups in a vertical direction using the control signal, relative to low frequency components thereof;

deemphasizing levels of high frequency components of the vertical-direction deemphasized TCI signals of groups in a time direction using the control signal, relative to low frequency components thereof;

obtaining the divided plurality of video signals by decompressing the time-direction deemphasized TCI signals of the groups per line; and obtaining the plurality of video signals by composing the divided plurality of video signals.

10. The method of claim 9, wherein the time direction deemphasis and the vertical direction deemphasis are both non-linear deemphasis each for deemphasizing the levels of the high frequency components variably according to the levels of signals input thereto.

11. A video signal deemphasis method used for obtaining a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the method comprising the steps of:

deemphasizing levels of high frequency components of the TCI signals of groups in a horizontal-direction using linear horizontal deemphasis, relative to low frequency components thereof;

generating a control signal on the basis of synchronizing signals included in the linearly horizontal-direction deemphasized TCI signals of the groups;

obtaining the divided plurality of video signals by decompressing the linearly horizontal-direction deemphasized TCI signals of the groups per line;

deemphasizing levels of high frequency components of the divided plurality of video signals in the horizontal direction using non-linear horizontal emphasis for varying emphasis of the high frequency components in accordance with the levels of the divided plurality of video signals, relative to low frequency components thereof;

deemphasizing levels of high frequency components of the non-linearly horizontal-direction deemphasized divided plurality of video signals in a vertical direction using the control signals, relative to low frequency components thereof;

deemphasizing levels of high frequency components of the non-linearly horizontal-direction deemphasized divided plurality of video signals in a time direction using the control signal, relative to low frequency components thereof; and obtaining the plurality of video signals by composing the time-direction deemphasized plurality of video signals.

12. The method of claim 11, wherein the time direction deemphasis and the vertical direction deemphasis are both non-linear deemphasis each for deemphasizing the levels of the high frequency components variably according to the levels of signals input thereto.

13. A video signal emphasis and deemphasis method, wherein a plurality of groups of time compensated integration (TCI) signals are obtained by dividing a plurality of video signals into a plurality of groups, and compressing and multiplexing the divided video signals of groups per line, the method comprising the steps of:

emphasizing levels of high frequency components of the video signals of the groups in a time direction except during a blanking signal period, relative to low frequency components thereof;

emphasizing levels of high frequency components of the time-direction emphasized video signals of the groups in a vertical direction except during the blanking signal period, relative to low frequency components thereof;

emphasizing levels of high frequency components of the vertical-direction emphasized video signals of the groups in a horizontal direction using non-linear horizontal emphasis for varying emphasis of the high frequency components in accordance with the levels of the vertical-direction emphasized video signals of the groups, relative to low frequency components thereof;

dividing the non-linearly horizontal-direction emphasized video signals into a plurality of groups;

obtaining a plurality of groups of TCI signals by compressing and multiplexing the divided video signals of groups per line;

emphasizing levels of high frequency components of the TCI signals of groups in the horizontal direction using linear horizontal emphasis, relative to low frequency components thereof;

deemphasizing levels of high frequency components of the TCI signals of groups in a horizontal direction using linear horizontal deemphasis, relative to low frequency components thereof;

generating a control signal on the basis of synchronizing signals included in the linearly horizontal-direction deemphasized TCI signals of the groups;

obtaining the divided plurality of video signals by decompressing the linearly horizontal-direction deemphasized TCI signals of the groups per line;

obtaining the plurality of video signals by composing the divided plurality of video signals;

deemphasizing levels of high frequency components of the plurality of the video signals in the horizontal direction using non-linear horizontal emphasis for varying emphasis of the high frequency components in accordance with the levels of the plurality of the video signals, relative to low frequency components thereof;

deemphasizing levels of high frequency components of the non-linearly horizontal direction deemphasized plurality of video signals in a vertical direction using the control signal, relative to low frequency components thereof; and deemphasizing levels of high frequency components of the vertical-direction deemphasized plurality of video signals in a time direction using the control signal, relative to low frequency components thereof.

14. A video signal emphasis and deemphasis method, wherein a plurality of groups of time compensated integration (TCI) signals are obtained by dividing a plurality of video signals into a plurality of groups, and compressing and multiplexing the divided video signals of groups per line, the method comprising the steps of:

dividing the plurality of video signals into a plurality of groups;

obtaining a plurality of groups of TCI signals by compressing and multiplexing the divided plurality of video signals per line;

emphasizing levels of high frequency components of the TCI signals of the groups in a time direction except during a blanking signal period, relative to low frequency components thereof;

emphasizing levels of high frequency components of the time-direction emphasized TCI signals of the groups in a vertical direction except during the blanking signal period, relative to low frequency components thereof;

emphasizing levels of high frequency components of the vertical-direction emphasized TCI signals of the groups in a horizontal direction using non-linear horizontal emphasis for varying emphasis of the high frequency components in accordance with the levels of the vertical-direction emphasized TCI signals of the groups, relative to low frequency components thereof;

emphasizing levels of high frequency components of the non-linearly horizontal-direction emphasized TCI signals of groups in the horizontal direction using linear horizontal emphasis, relative to low frequency components thereof;

deemphasizing levels of high frequency components of the TCI signals of groups in a horizontal direction using linear horizontal deemphasis, relative to low frequency components thereof;

generating a control signal on the basis of synchronizing signals included in the linearly horizontal-direction deemphasized TCI signals of the groups deemphasizing levels of high frequency components of the linearly horizontal-direction deemphasized TCI signals of groups in the horizontal direction using non-linear horizontal emphasis for varying emphasis of the high frequency components in accordance with the levels of the plurality of the TCI signals of groups, relative to low frequency components thereof;

deemphasizing levels of high frequency components of the non-linearly horizontal-direction deemphasized TCI signals of groups in a vertical direction using the control signal, relative to low frequency components thereof;

deemphasizing levels of high frequency components of the vertical-direction deemphasized TCI signals of groups in a time direction using the control signal, relative to low frequency components thereof;

obtaining the divided plurality of video signals by decompressing the time-direction deemphasized TCI signals of the groups per line; and obtaining the plurality of video signals by composing the divided plurality of video signals.

15. A video signal emphasis and deemphasis method, wherein a plurality of groups of time compensated integration (TCI) signals are obtained by dividing a plurality of video signals into a plurality of groups, and compressing and multiplexing the divided video signals of groups per line, the method comprising the steps of:

dividing the plurality of video signals into a plurality of groups;

emphasizing levels of high frequency components of the video signals of the groups in a time direction except during a blanking signal period, relative to low frequency components thereof;

emphasizing levels of high frequency components of the time-direction emphasized video signals of the groups in a vertical direction except during the blanking signal period, relative to low frequency components thereof;

emphasizing levels of high frequency components of the vertical-direction emphasized video signals of the groups in a horizontal direction using non-linear horizontal emphasis for varying emphasis of the high frequency components in accordance with the levels of the vertical-direction emphasized video signals of the groups, relative to low frequency components thereof;

obtaining a plurality of groups of TCI signals by compressing and multiplexing the non-linearly horizontal-direction emphasized video signals of the groups;

emphasizing levels of high frequency components of the TCI signals of groups in the horizontal direction using linear horizontal emphasis, relative to low frequency components thereof;

deemphasizing levels of high frequency components of the TCI signals of groups in a horizontal direction using linear horizontal deemphasis, relative to low frequency components thereof;

generating a control signal on the basis of synchronizing signals included in the linearly horizontal-direction deemphasized TCI signals of the groups;

obtaining the divided plurality of video signals by decompressing the linearly horizontal-direction deemphasized TCI signals of the groups per line;

deemphasizing levels of high frequency components of the divided plurality of video signals in the horizontal direction using non-linear horizontal emphasis for varying emphasis of the high frequency components in accordance with the levels of the divided plurality of video signals, relative to low frequency components thereof;

deemphasizing levels of high frequency components of the non-linearly horizontal-direction deemphasized divided plurality of video signals in a vertical direction using the control signal, relative to the low frequency components thereof;

deemphasizing levels of high frequency components of the vertical-direction deemphasized divided plurality of video signals in a time-direction using the control signal, relative to low frequency components thereof; and obtaining the plurality of video signals by composing the time direction deemphasized divided plurality of video signals.

16. A video signal emphasis apparatus used for obtaining a plurality of groups of time compensated integration (TCI) signals by dividing a plurality of video signals into a plurality of groups, and compressing and multiplexing the divided video signals of groups per line, the apparatus comprising:

a first emphasizer to emphasize levels of high frequency components of the video signals of the groups in a time direction except during a blanking signal period, relative to low frequency components thereof;

a second emphasizer to emphasize levels of high frequency components of the time-direction emphasized video signals of the groups in a vertical direction except during the blanking signal period, relative to low frequency components thereof;

a third emphasizer to emphasize levels of high frequency components of the vertical-direction emphasized video signals of the groups in a horizontal direction using non-linear horizontal emphasis for varying emphasis of the high frequency components in accordance with the levels of the vertical-direction emphasized video signals of the groups, relative to low frequency components thereof;

a divider to divide the non-linearly horizontal-direction emphasized video signals into a plurality of groups;

means for obtaining a plurality of groups of TCI signals by compressing and multiplexing the divided video signals of groups per line; and a fourth emphasizer to emphasize levels of high frequency components of the TCI signals of groups in the horizontal direction using linear horizontal emphasis, relative to low frequency components thereof.

17. The apparatus of claim 16, wherein the first and the second emphasizers are non-linear emphasizers each for emphasizing the levels of the high frequency components variably according to the levels of signals input thereto.

18. A video signal emphasis apparatus used for obtaining a plurality of groups of time compensated integration (TCI) signals by dividing a plurality of video signals into a plurality of groups, and compressing and multiplexing the divided video signals of groups per line, the apparatus comprising:

a divider for dividing the plurality of video signals into a plurality of groups;

means for obtaining a plurality of groups of TCI signals by compressing and multiplexing the divided plurality of video signals per line;

a first emphasizer to emphasize levels of high frequency components of the TCI signals of the groups in a time direction except during a blanking signal period, relative to low frequency components thereof;

a second emphasizer to emphasize levels of high frequency components of the time-direction emphasized TCI signals of the groups in a vertical direction except during the blanking signal period, relative to low frequency components thereof;

a third emphasizer to emphasize levels of high frequency components of the vertical-direction emphasized TCI signals of the groups in a horizontal direction using non-linear horizontal emphasis for varying emphasis of the high frequency components in accordance with the levels of the vertical direction emphasized TCI signals of the groups, relative to low frequency components thereof; and a fourth emphasizer to emphasize levels of high frequency components of the non-linearly horizontal-direction emphasized TCI signals of groups in the horizontal direction using linear horizontal emphasis, relative to low frequency components thereof.

19. The apparatus of claim 18, wherein the first and the second emphasizers are non-linear emphasizers each for emphasizing the levels of the high frequency components variably according to the levels of signals input thereto.

20. A video signal emphasis apparatus used for obtaining a plurality of groups of time compensated integration (TCI) signals by dividing a plurality of video signals into a plurality of groups, and compressing and multiplexing the divided video signals of groups per line, the apparatus comprising:

a divider to divide the plurality of video signals into a plurality of groups;

a first emphasizer to emphasize levels of high frequency components of the video signals of the groups in a time direction except during a blanking signal period, relative to low frequency components thereof;

a second emphasizer to emphasize levels of high frequency components of the time-direction emphasized video signals of the groups in a vertical direction except during the blanking signal period, relative to low frequency components thereof;

a third emphasizer to emphasize levels of high frequency components of the vertical-direction emphasized video signals of the groups in a horizontal direction using non-linear horizontal emphasis for varying emphasis of the high frequency components in accordance with the levels of the vertical-direction emphasized video signals of the groups, relative to low frequency components thereof;

means for obtaining a plurality of groups of TCI signals by compressing and multiplexing the non--linearly horizontal-direction emphasized video signals of the groups; and a fourth emphasizer to emphasize levels of high frequency components of the TCI signals of groups in the horizontal direction using linear horizontal emphasis, relative to low frequency components thereof.

21. The apparatus of claim 20, wherein the first and the second emphasizers are non-linear emphasizers each for emphasizing the levels of the high frequency components variably according to the levels of signals input thereto.

22. A video signal deemphasis apparatus used for obtaining a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the apparatus comprising:

a first deemphasizer to deemphasize levels of high frequency components of the TCI signals of groups in a horizontal direction using linear horizontal deemphasis, relative to low frequency components thereof;

a generator to generate a control signal on the basis of synchronizing signals included in the linearly horizontal-direction deemphasized TCI signals of the groups;

means for obtaining the divided plurality of video signals by decompressing the linearly horizontal-direction deemphasized TCI signals of the groups per line;

means for obtaining the plurality of video signals by composing the divided plurality of video signals;

a second deemphasizer to deemphasize levels of high frequency components of the plurality of the video signals in the horizontal direction using non-linear horizontal emphasis for varying emphasis of the high frequency components in accordance with the levels of the plurality of the video signals, relative to low frequency components thereof;

a third deemphasizer to deemphasize levels of high frequency components of the non-linearly horizontal-direction deemphasized plurality of video signals in a vertical direction using the control signal, relative to low frequency components thereof; and a fourth deemphasizer to deemphasize levels of high frequency components of the vertical direction deemphasized plurality of video signals in a time direction using the control signal, relative to low frequency components thereof.

23. The apparatus of claim 22, wherein the third and the fourth deemphasizers are non-linear deemphasizers each for deemphasizing the levels of the high frequency components variably according to the levels of signals input thereto.

24. A video signal deemphasis apparatus used for obtaining a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the apparatus comprising:

a first deemphasizer to deemphasize levels of high frequency components of the TCI signals of groups in a horizontal direction using linear horizontal deemphasis, relative to low frequency components thereof;

a generator to generate a control signal on the basis of synchronizing signals included in the linearly horizontal-direction deemphasized TCI signals of the groups;

a second deemphasizer to deemphasize levels of high frequency components of the linearly horizontal-direction deemphasized TCI signals of groups in the horizontal direction using non-linear horizontal emphasis for varying emphasis of the high frequency components in accordance with the levels of the plurality of the TCI signals of groups, relative to low frequency components thereof;

a third deemphasizer to deemphasize levels of high frequency components of the non-linearly horizontal-direction deemphasized TCI signals of groups in a vertical direction using the control signal, relative to low frequency components thereof;

a fourth deemphasizer to deemphasize levels of high frequency components of the vertical-direction deemphasized TCI signals of groups in a time direction using the control signal, relative to low frequency components thereof;

means for obtaining the divided plurality of video signals by decompressing the time-direction deemphasized TCI signals of the groups per line; and means for obtaining the plurality of video signals by composing the divided plurality of video signals.

25. The apparatus of claim 24, wherein the third and the fourth deemphasizers are non-linear deemphasizers each for deemphasizing the levels of the high frequency components variably according to the levels of signals input thereto.

26. A video signal deemphasis apparatus used for obtaining a plurality of video signals, in a signal processing of obtaining time compensated integration (TCI) signals by dividing a plurality of video signals into a plurality of groups, and compressing and multiplexing the divided video signals of groups per line, the plurality of video signals being obtained by applying emphasis to the video signals divided into the groups in a time direction, emphasis in a vertical direction, emphasis in a horizontal direction using non-linear emphasis and emphasis in the horizontal direction using linear emphasis in an order to obtain the TCI signals, the TCI signals being decompressed to obtain the divided video signals, the divided video signals being composed to obtain the plurality of video signals, the apparatus comprising:

a first deemphasizer to deemphasize levels of high frequency components of the TCI signals of groups in a horizontal direction using linear horizontal deemphasis, relative to low frequency components thereof;

a generator to generate a control signal on the basis of synchronizing signals included in the linearly horizontal direction deemphasized TCI signals of the groups;

means for obtaining the divided plurality of video signals by decompressing the linearly horizontal-direction deemphasized TCI signals of the groups per line;

a second deemphasizer to deemphasize levels of high frequency components of the divided plurality of video signals in the horizontal direction using non-linear horizontal emphasis for varying emphasis of the high frequency components in accordance with the levels of the divided plurality of video signals, relative to low frequency components thereof;

a third deemphasizer to deemphasize levels of high frequency components of the non-linearly horizontal-direction deemphasized divided plurality of video signals in a vertical direction using the control signal, relative to low frequency components thereof;

a fourth deemphasizer to deemphasize levels of high frequency components of the vertical-direction deemphasized divided plurality of video signals in a time direction using the control signal, relative to low frequency components thereof; and means for obtaining the plurality of video signals by composing the time-direction deemphasized divided plurality of video signals.

27. The apparatus of claim 26, wherein the third and the fourth deemphasizers are non-linear deemphasizers each for deemphasizing the levels of the high frequency components variably according to the levels of signals input thereto.

* * * * *